(12) United States Patent
Kraft et al.

(10) Patent No.: US 8,020,172 B2
(45) Date of Patent: Sep. 13, 2011

(54) USING STATUS MODELS HAVING STATUS DERIVATIONS IN A COMPUTER SYSTEM

(75) Inventors: Frank Michael Kraft, Speyer (DE);
Guenter Pecht-Seibert, Muehlhausen (DE); Klaus Meyer, Walldorf (DE);
Bernhard Thimmel, Heidelberg (DE);
Patrick Josef Bardroff, Leimen (DE);
Gregor Schilberth, Heidelberg (DE);
Wasim Sadiq, Pullenvale (AU)

(73) Assignee: SAP AG, Walldorf ( * ) Notice: Subject to any disclaimer, the term of this patent is extended or adjusted under 35 U.S.C. 154(b) by 1230 days.

(21) Appl. No.: 11/617,638

(22) Filed: Dec. 28, 2006

(65) Prior Publication Data

US 2008/0005061 A1  Jan. 3, 2008

Related U.S. Application Data

(63) Continuation-in-part of application No. 11/477,787, filed on Jun. 30, 2006.

(51) Int. Cl.
*G06F 9/44* (2006.01)
*G06Q 30/00* (2006.01)

(52) U.S. Cl. ..................... 719/316; 705/26.82
(58) Field of Classification Search ............... 705/26.82; 719/316
See application file for complete search history.

(56) References Cited

U.S. PATENT DOCUMENTS

| 5,920,718 | A | 7/1999 | Uczekaj et al. |
|---|---|---|---|
| 5,983,016 | A | 11/1999 | Brodsky et al. |
| 5,991,733 | A | 11/1999 | Aleia et al. |
| 6,078,325 | A | 6/2000 | Jolissaint et al. |
| 6,151,023 | A | 11/2000 | Chari |
| 6,175,837 | B1 | 1/2001 | Sharma et al. |
| 6,182,277 | B1 | 1/2001 | DeGroot |
| 6,480,955 | B1 | 11/2002 | DeKoning et al. |
| 6,553,403 | B1 | 4/2003 | Jarriel et al. |
| 6,769,048 | B2 | 7/2004 | Goldberg et al. |
| 7,606,791 | B2 | 10/2009 | Dettinger et al. |
| 7,613,993 | B1 | 11/2009 | Baer et al. |
| 7,761,337 | B2 * | 7/2010 | Caballero et al. ............... 705/26 |
| 2002/0013777 | A1 | 1/2002 | Diener |

(Continued)

FOREIGN PATENT DOCUMENTS

EP  1 674 990   6/2006

(Continued)

OTHER PUBLICATIONS

Leavens, Gary T. et al., "Preliminary Design of JML: A Behavioral Interface Specification Language of Java," ACM SIGSOFT Software Engineering Notes, vol. 31, No. 3, May 2006, pp. 1-38.

(Continued)

*Primary Examiner* — H. Sough
*Assistant Examiner* — Charles E Anya
(74) *Attorney, Agent, or Firm* — Fish & Richardson P.C.

(57) ABSTRACT

A design-time status schema model describes the progress of a data object through a computing process. The status schema model includes status variables, processing actions and constraints for performing actions. The status schema model also may describe permitted changes to a status variable in response to performing an action. At runtime, the status schema model is used to control processing performed by, or on, an instance of a data object corresponding to the status schema model.

8 Claims, 24 Drawing Sheets

U.S. PATENT DOCUMENTS

| | | |
|---|---|---|
| 2002/0138290 A1 | 9/2002 | Metcalfe et al. |
| 2002/0152102 A1 | 10/2002 | Brodersen et al. |
| 2003/0018461 A1 | 1/2003 | Beer et al. |
| 2003/0046658 A1 | 3/2003 | Raghavan et al. |
| 2003/0195789 A1 | 10/2003 | Yen |
| 2004/0193510 A1* | 9/2004 | Catahan et al. ............... 705/28 |
| 2005/0004888 A1 | 1/2005 | McCrady et al. |
| 2005/0004951 A1 | 1/2005 | Ciaramitaro et al. |
| 2005/0137928 A1 | 6/2005 | Scholl et al. |
| 2006/0085681 A1 | 4/2006 | Feldstein et al. |
| 2006/0095439 A1 | 5/2006 | Buchmann et al. |
| 2006/0136923 A1 | 6/2006 | Kahn et al. |
| 2006/0265691 A1 | 11/2006 | Klinger et al. |
| 2007/0226025 A1 | 9/2007 | Chang et al. |
| 2008/0005152 A1 | 1/2008 | Kraft |
| 2008/0005153 A1 | 1/2008 | Kraft |
| 2008/0005162 A1 | 1/2008 | Kraft |
| 2008/0005625 A1 | 1/2008 | Kraft |
| 2008/0005739 A1 | 1/2008 | Sadiq |
| 2008/0005743 A1 | 1/2008 | Kraft |
| 2008/0005747 A1 | 1/2008 | Meyer et al. |
| 2008/0046862 A1 | 2/2008 | Sattler et al. |
| 2008/0162672 A1 | 7/2008 | Krasinskiy |
| 2009/0089309 A1 | 4/2009 | Thimmel |

FOREIGN PATENT DOCUMENTS

WO     WO 2005/117549 A3     12/2005

OTHER PUBLICATIONS

Kiezales, Gregor et al., "An Overview of Aspect," Lecture notes in Computer Science, Springer Verlag, Berlin, Germany, vol. 2072, Jun. 18, 2001, pp. 327-353.

International Search Report and Written Opinion of the International Searching Authority issued on Nov. 30, 2007, in corresponding application PCT/EP2007/005785.

Non-Final Office Action issued in U.S. Appl. No. 11/477,787 on Dec. 29, 2009, 12 pages.

Final office action from U.S. Appl. No. 11/477,787 dated Jun. 24, 2010, 18 pages.

Non-Final Office Action issued in U.S. Appl. No. 11/617,580 on Dec. 30, 2009, 13 pages.

Merriam-Webster Online, "Programmatically—Definition and More from the Free Merriam Webster" downloaded Jun. 16, 2010, http://www.merriam-webster.com/dictionary/programmatically.

Office action from U.S. Appl. No. 11/617,577 dated Mar. 25, 2010, 21 pages.

Office action from U.S. Appl. No. 11/617,495 dated Mar. 18, 2010, 17 pages.

Final Office Action from U.S. Appl. No. 11/617,580 dated Jun. 24, 2010, 13 pages.

Office action from U.S. Appl. No. 11/617,616 dated Apr. 19, 2010, 15 pages.

Office action from U.S. Appl. No. 11/617,462 dated May 11, 2010, 23 pages.

Final Office Action from U.S. Appl. No. 11/862,813 dated Jun. 11, 2010, 7 pages.

Non-Final Office Action issued in U.S. Appl. No. 11/477,787 on Dec. 29, 2009, 12 pages.

Jason Zhicheng Li, "Business Object State Management Using State Machine Compiler," Internet Citation, May 1, 2006 (May 2, 2006), XP002396380, Retrieved from the internet: http://today.java.ne/pub/a/today/2006_/01/05/business-object-state_management-using-smc.html, retrieved Aug. 24, 2006.

Eric Armstrong, "How to implement state-dependent behavior—Doing the State pattern in Java," internet citation, XP002246628 ISSN: 1091-8906, Retrieved from the internet: http://222.javaworld.com/javaworld/jw-08-1997/jw-08-stated_p.html, retrieved on Jul. 7, 2003.

W.M.P. van der Aaslt and M. Pesic, "DecSerFlow: Towards a Truly Declarative Service Flow Language", in M. Bravetti, M. Nunez, and G. Zavattaro, editors, International Conference on Web Services and Formal Methods (WS-FM 2006), vol. 4184 of Lecture Notes in Computer Science, pp. 1-23, Springer-Verlag, Berlin, 2006.

Lohman et al., "Behavioral Contraints for Services", Business Process Management, $5^{th}$ International Conference, BPM, 2007, Brisbane, Australia.

Holger Giese, "Object-Oriented Design and Architecture of Distributed Systems", Inaugural-Dissertation, Department of Mathematics and Computer Science, Faculty of Mathematics and Natural Science, Westfalischen Wilhelms-Universität Münster, for the degree of Doctor of Science, Feb. 2001.

Beugnard et al., "Making Components Contract Aware", IEEE Computer Society, Jul. 1999, pp. 38-45.

Wirtz et al., "The OCoN Approach to Workflow Modeling in Object-Oriented Systems", Information Systems Frontiers 3:3, 357-376, 2001.

"Unified Modeling Language: Superstructure", Version 2.0, formal/Jul. 4, 2005, Object Management Group, Aug. 2005.

"Unified Modeling Language: Infrastructure", Version 2.1.1 (without change bars), formal/Jul. 2, 2006, Object Management Group, Feb. 2007.

"Unified Modeling Language: Superstructure", Version 2.1.1 (non-change bar), formal/Jul. 2, 2005, Object Management Group, Feb. 2007.

"Object Constraint Language", OMG Available Specification, Version 2.0, formal/Jun. 5, 2001, Object Management Group, May 2006.

Baldan et al., "Functorial Concurrent Semantics for Petri Nets and Read and Inhibitor Arcs", Lecture Notes in Computer Science, vol. 1877, Proceedings of the $11^{th}$ International Conference on Concurrency Theory, Springer-Verlag, 2000.

"Business Process Modeling Notation Specification", Final Adopted Specification, dtc/Jun. 2, 2001, Object Management Group, Feb. 2006.

S. Christensen and N. Hansen, "Coloured Petri Nets Extended with Place Capacities, Test Arcs and Inhibitor Arcs", Lecture Notes in Computer Science, vol. 691, Proceedings of the $14^{th}$ International Conference on Application and Theory of Petri Nets, Springer-Verlag, 1993.

S. Stelting et al., "Applied Java Patterns" (Online), Dec. 26, 2001, Prentice Hall, retrieved from the internet: http://proquest.safaribooksonline.com/0130935387?tocview=true>, retrieved Aug. 7, 2009).

International Search Report and Written Opinion of the International Searching Authority issued in PCT/EP2007/005783 on Jan. 7, 2009.

International Search Report and Written Opinion of the International Searching Authority issued in PCT/EP2007/005779 on Dec. 30, 2008.

International Search Report and Written Opinion of the International Searching Authority issued in PCT/EP2007/005782 on Dec. 30, 2008.

International Search Report and Written Opinion of the International Searching Authority issued in PCT/EP2007/005786 on Jan. 8, 2009.

International Search Report and Written Opinion of the International Searching Authority issued in PCT/EP2007/005784 on Dec. 29, 2008.

International Search Report and Written Opinion of the International Searching Authority issued in PCT/EP2007/005781 on Dec. 30, 2008.

Extended European Search Report issued in 07025131.9-1243 / 1939744 on Aug. 19, 2009.

Non-Final Office Action issued in U.S. Appl. No. 11/617,462 on Nov. 20, 2009.

Non-Final Office Action issued in U.S. Appl. No. 11/862,813 on Nov. 25, 2009.

Kraft et al., U.S. Appl. No. 12/102,548, filed Apr. 14, 2008.

Thimmel et al., U.S. Appl. No. 12/020,984, filed Jan. 28, 2008.

Kraft et al., U.S. Appl. No. 12/634,834, filed Dec. 10, 2009.

Kraft et al., U.S. Appl. No. 12/634,996, filed Dec. 10, 2009.

Final office action from U.S. Appl. No. 11/617,577, dated Aug. 25, 2010, 21 pages.

Final office action from U.S. Appl. No. 11/617,495, dated Aug. 25, 2010, 16 pages.

Office action from U.S. Appl. No. 11/617,464, dated Sep. 3, 2010, 14 pages.
Final office action from U.S. Appl. No. 12/020,984, dated Sep. 30, 2010, 17 pages.
Office action from U.S. Appl. No. 11/617,462, dated Nov. 1, 2010, 16 pages.
Office action from U.S. Appl. No. 11/617,647, dated Nov. 5, 2010, 26 pages.
Office action from U.S. Appl. No. 11/617,464, dated Feb. 28, 2011, 14 pages.

* cited by examiner

| ATPCONFIRMATION | ACCEPTANCE | INVOICING | LIFECYCLE |
|---|---|---|---|
| NOT CONFIRMED | NONE | NOT INVOICED | IN PREPARATION |
| CONFIRMED | NONE | NOT INVOICED | IN ACCEPTANCE |
| CONFIRMED | ACCEPTED | NOT INVOICED | IN EXECUTION |
| CONFIRMED | ACCEPTED | INVOICED | COMPLETED |
| * | REJECTED | NOT INVOICED | REJECTED |

FIG. 15

USING STATUS MODELS HAVING STATUS DERIVATIONS IN A COMPUTER SYSTEM

CROSS REFERENCE TO RELATED APPLICATIONS

This application is a continuation-in-part of U.S. application Ser. No. 11/477,787, filed Jun. 30, 2006 and titled SYSTEM AND METHOD FOR OBJECT STATE MANAGEMENT.

TECHNICAL FIELD

This description relates to techniques for controlling transaction processing that is performed by computer systems.

BACKGROUND

Software systems and components may be developed using object technology, and the operation of these systems and components may occur through methods that are performed on and/or by objects. An object's state may be said to include the combination of current attribute values of the object at a particular point in time. The execution of a method may change attribute values of an object, which, in turn, may lead to a new state of the object. Sometimes the current state of the object or computing environment may be an important factor in determining whether a particular action is allowed to be performed or not.

One approach to ensuring that an object performs an action only when allowed by a particular state of the object is programming such requirements into the object itself. Another approach is to rely on the programming of other unrelated objects—that are called by the object to implement all or part of the action—to enforce such requirements.

For example, software that controls an assembly line in a manufacturing plant should be programmed so that a "stop" action should not be performed on the assembly line if the assembly line current is not moving (e.g., as represented by the state of an object representing the assembly line).

Under the first scenario described above, a programmer of the object may directly code this requirement into the object itself, so that when the object receives a "stop" action request, the object checks its own status attributes to make sure that the assembly line is currently moving before allowing the "stop" action to be processed. However, as software projects become larger and more complex, it may become increasingly burdensome for programmers to understand, identify and account for all constraints that are based on the state of an object.

Under the second scenario described above, the programmer of the object may rely on other programming to enforce this requirement. In this example, the assembly line object (which may or may not have its own status attributes regarding the movement of the assembly line) would receive the "stop" active request, and call another unrelated object to implement all or part of the "stop" action. The other object would then check its own status attributes to make sure that the assembly line is currently moving before allowing the "stop" action to be processed, but its determination would be independent of the state of the assembly line object.

SUMMARY

In one general aspect, values of status variables used in a computer-based process are set. An indication of a status value of a source status variable of an instance of a source data object node is received. A status value of a target status variable of an instance of a target data object node is set based on the status value of the source status variable. The target data object node is different than the source data object node. The source data object node corresponds to both a status management model for the source data object node and a data model for the source data object node. The target data object node corresponds to both a status management model for the target data object node and a data model for the target data object node.

Implementations may include one or more of the following features. For example, a status management runtime component may receive the indication of the status value and may set the status value of the target status variable.

The instance of the source data object node may be an instance of a parent data object node. The instance of the target data object node may be an instance of a child data object node of the parent data object node. The status value of the parent status variable may be the same value as the status value of the child status variable.

A status value of a second target status variable of an instance of a second child data object node may be set based on the status value of the source status variable. The instance of the second child data object node may be an instance of the same child data object node of the parent data object node. The target status variable may be the same status variable as the second target status variable. The status value of the source status variable may be the same value as the status value of the second target status variable.

A status value of a second target status variable of an instance of a second child data object node may be set based on the status value of the source status variable, where the instance of the second child data object node is an instance of a different child data object node of the parent data object node than the second child data object node. The target status variable may be the same status variable as the second target status variable, and the status value of the source status variable may be the same value as the status value of the second target status variable.

The instance of the target data object node may be an instance of a parent data object node, and the instance of the source data object node may be an instance of a child data object node of the parent data object node.

The status model of the child data object node may define a status value of a status variable to be set in the parent data object node. A status value of the target status variable of the instance of the parent data object node may be determined based on the status value of the source status variable of the instance of the child data object node. A status value of the target status variable of an instance of the parent data object node may be set based on the status value of the source status variable of multiple instances of the child data object node, where the status value of the source status variable of one of the multiple instances of the child data object node is different than the status value of the source status variable of another of the multiple instances of the child data object node.

A status value of the target status variable of an instance of the parent data object node may be set based on i) the status value of the source status variable of the instance of the child data object node and ii) a second status value of a second source status variable of a second instance of a second child data object node. The second child data object node may be a different node than the child data object node.

A runtime processing component may send, to the status management runtime component, the indication of the status value of the source status variable of the instance of the source data object node and an indication of the instance of the target data object. A runtime processing component may include the status management runtime component.

In another general aspect, a status value of a first source status variable of an instance of a data object node is accessed. A status value of a second source status variable of the instance of the data object node is accessed. The status value of the first source status variable and the status value of the second source status variable are processed to determine a status value to set for a target status variable of the instance of the data object node. The target status variable is set to the determined status value. The data object node corresponds to both a status management model for the data object node and a data model for the source object node.

Implementations may include one or more of the features noted above.

Implementations of any of the techniques described above may include a method or process, an apparatus or system, or computer software on a computer-accessible medium. The details of particular implementations are set forth in the accompanying drawings and description below. Other features will be apparent from the following description, including the drawings, and the claims.

DESCRIPTION OF DRAWINGS

FIG. 15 illustrates an example table showing how the value of status variable life cycle is determined based on the model of FIG. 14.

Like reference symbols in the various drawings indicate like elements.

DETAILED DESCRIPTION

Techniques are provided that allow for the management of the state of an object node in a less burdensome and more coherent manner. There are various ways of implementing objects in software applications. The term "object node" is used in this description to refer to either an overall object or particular elements of an object (e.g., particular methods and/or attributes associated with the object). When an object node is used in a business software application, the object node may be referred to as a business object node or an application object node. The term "data object node" also may be used to refer to an object node. A data object node may refer to a business object node, for example, that includes variables and methods related to a business entity, such as a document (e.g., a sales order, a purchase order or an invoice), an organization (e.g., such as a business partner, supplier or customer) or a person (e.g., such as an employee or a customer). A data object node also may refer to a processing object node, such as an object node that processing information for an entity being processed in a workflow.

Figure 1:
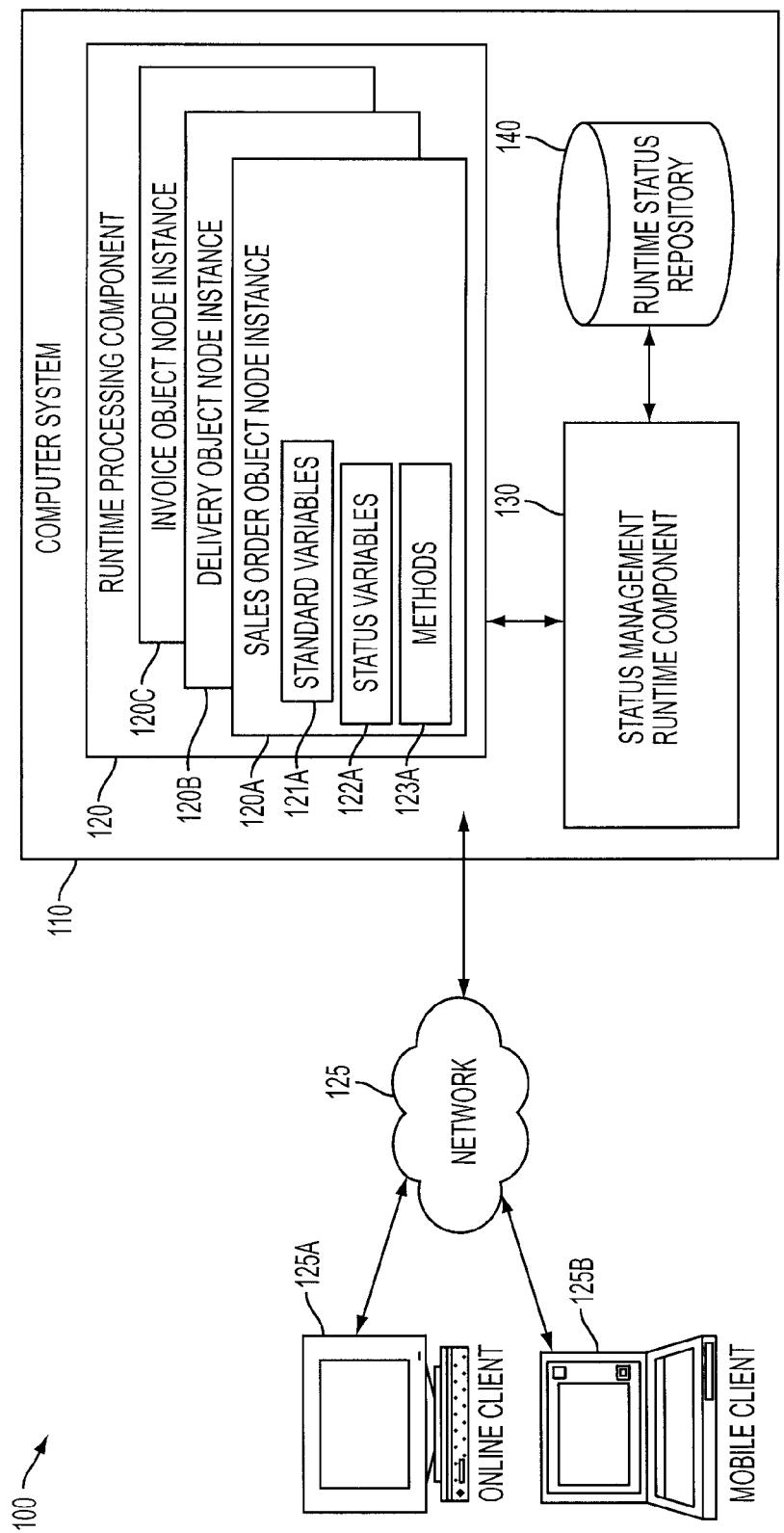
FIGS. 1 and 3 are block diagrams of computer systems that use a constraint-based model to control data processing.

FIG. 1 shows a system 100 of networked computers that uses a constraint-based model to control data processing. In general, the system 100 uses a status schema instance of a status schema model to determine whether an action is permitted to be performed by a data object node.

More particularly, the system 100 of networked computers includes a computer system 110 having a runtime processing component 120, a runtime status management component 130 and a runtime status repository 140. The computer system 110 may be a general-purpose computer or a special-purpose computer.

The runtime processing component 120 includes various data object nodes (here, sales order object node instance 120A, a delivery object node instance 120B and an invoice object node instance 120C). Each of the object node instances 120A, 120B and 120C is a collection of data variables and methods that may be performed by the data object node instance. In this example, each instance 120A-120C has standard variables, each of which corresponds to a characteristic or attribute of the object node instance. For example, a sales order object node instance 120A may include, for example, standard variables identifying a customer to whom the sale was made and the date of the sale. Each instance 120A-120C also has one or more status variables. A status variable indicates a status of the data object node instance. For example, a status variable may indicate the status of a data object node instance relative to a stage of processing. In a more particular example, a status variable may indicate whether a sales order object node instance 120 has been approved. Each instance 120A-120C also has methods that may be executed by the object node instance. As shown, the sales order object node instance 120A has standard variables 121A, status variables 122A and methods 123A. The object node instances 120B and 120C also have standard variables, status variables and methods (not shown).

As shown here, the object node instances 120A, 120B and 120C each correspond to a principal entity represented in the computer system 110. Each of the example object node instances 120A-120C relate to a document used in a business process—here, respectively, the instances correspond to documents used in the business process of delivering and invoicing merchandise sold to a customer. Another example of a data object node instance include information about a customer, an employee, a product, and a business partner (such as a supplier). A data object node instance may be stored as one or more rows in a relational database table (or tables), a persistent object instance in an object-oriented database, data in one or more extensible mark-up language (XML) files, or one or more records in a data file.

In some implementations, an object node instance may be related to other object node instances. In one example, a sales order may include multiple sales order nodes, such as a root node identifying information that applies to the sales order (such as information that identifies the customer and the date the sales order was placed) and one or more item nodes identifying information related to each type of item ordered (such as an item number, quantity ordered, price of each item and cost of items ordered). In another example, each of the sales order object node instance 120A, delivery object node instance 120B and invoice object node instance 120C may relate to a sale of merchandise to a customer. As such, each of object node instances 120A-120C may be said to relate to one another.

Figure 2:
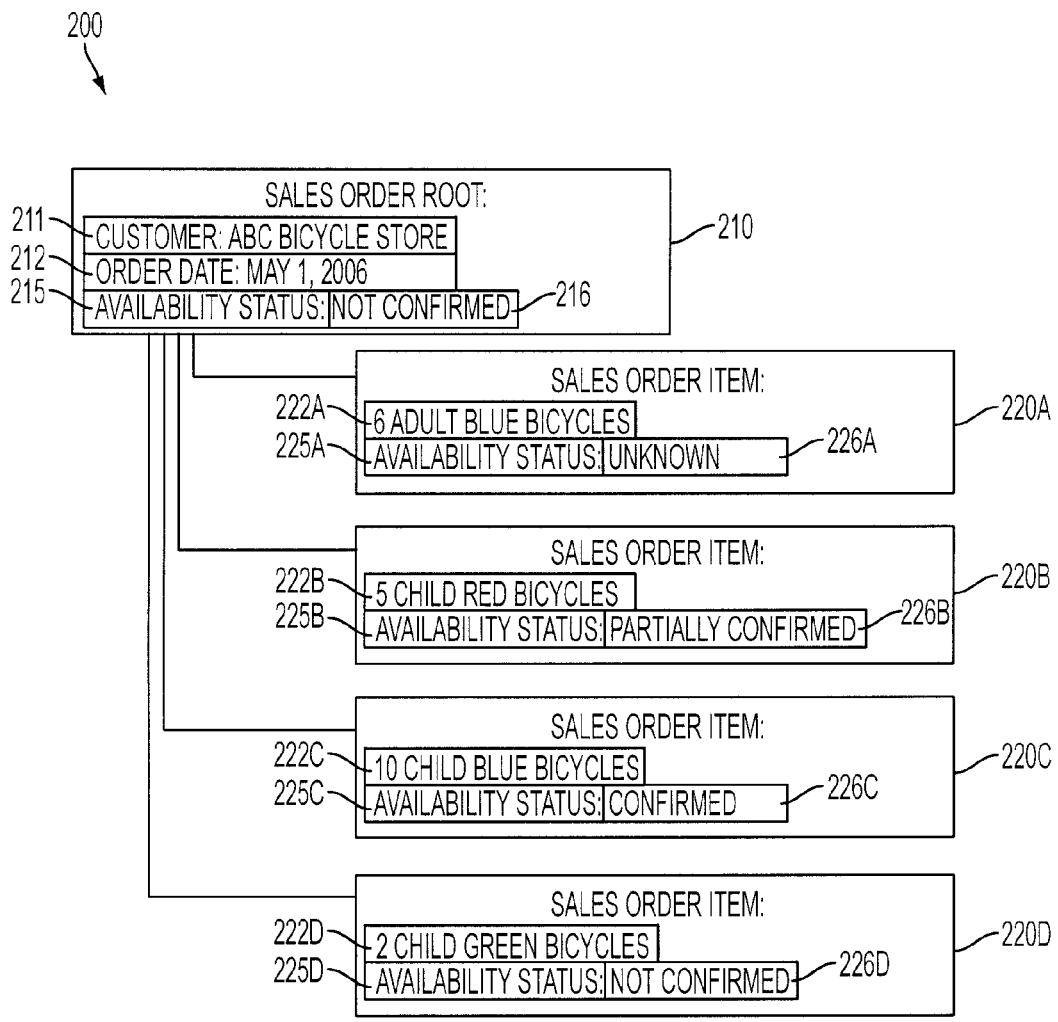
FIG. 2 is a block diagram of runtime sales order nodes instances.

FIG. 2 illustrates an example of runtime sales order node instances 200, which collectively represent a sales order by a customer (i.e., "ABC Bicycle Store") for products (i.e., bicycles). In this example, a sales order root instance 210 is related to sales order item instances 220A-220D. The sales order root instance 210 may be referred to as the parent node of each of the sales order item instances 220A-220D. In turn, each of the sales order item instances 220A-220D may be said to be a child node of the sales order root instance 210. Each of the sales order item instances 220A-220D also may be referred to as a sibling node of the other sales order item instances 220A-220D.

More particularly, the sales order root instance 210 has a customer 211 variable with a value "ABC Bicycle Store" and an order date 212 variable with a value of "May 1, 2006." Each variable 211 and 212 may be referred to as a standard variable or characteristic of the sales order root. The sales order root 210 has an availability status variable 215 having a value 216 of NOT CONFIRMED. As described more fully later, the availability status value of 216 is a reflection of the available status values of the sales order item instances 220A-220D.

Each of the sales order item instances 220A-220D have a standard variable 222A-222D with a value describing a type of bicycle and a corresponding quantity purchased. For example, sales order item instance 220A has a standard variable 222A identifying "6 adult blue bicycles" as the type and quantity of a bicycle purchased.

Each of the sales order item instances 220A-220D also has an availability status variable 225A-225D having a value 226A-226D that identifies the availability status of the bicycles identified in the standard variable 225A-225D. For example, the sales order item 220A has an availability status value 226A of UNKNOWN for six adult blue bicycles; the sales order item 220B has an availability status value 226B of PARTIALLY CONFIRMED for five child red bicycles; the sales order item 220C has an availability status value 226C of CONFIRMED for ten child blue bicycles; and the sales order item 220D has an availability status value of NOT CONFIRMED for two child green bicycles.

Referring again to FIG. 1, the status management runtime 130 tracks status information associated with object node instances 120A-120C in the status repository 140 and makes determinations, on behalf of the object node instances, as to whether actions are allowed to be performed based at least in part on the status information associated with the object nodes in the status repository.

When one of the object node instances 120A, 120B or 120C of the runtime processing component 120 receives a request to perform an action, the object node instance 120A, 120B or 120C sends a request to the status management runtime component 130 to determine whether the action is allowed to be performed. The status management runtime component 130 checks the runtime status repository 140 to determine whether the status information associated with the object node instance 120A, 120B or 120C permits the action to be performed. The status information associated with the object node instance may include the values of one or more status variables associated with the object node instance and one or more constraints identifying what actions may be allowed to be performed based at least in part on the values of the one or more status variables. The status information also may include one or more constraints identifying what status variable values may be allowed to be set following the performance of an action. The status information may include one or more constraints identifying what status variable values may be changed based on a change in one or more other status variable values.

When the outcome of the determination specifies that the action is not allowed, the status management runtime component 130 sends a response to the object node instance 120A, 120B or 120C indicating that the action is not allowed to be performed, and the object node instance 120A, 120B or 120C processes the negative response by inhibiting the action from being performed. One example of inhibiting the action is to send an error message to the source that requested the action to be performed. Another example is to simply ignore the action request and continue on as if the action had never been requested. Yet another example is forwarding the negative response to another application for processing.

On the other hand, when the outcome of the determination specifies that the action is allowed, the status management runtime component 130 sends a response to the object node instance 120A, 120B or 120C indicating that the action is allowed to be performed, and the object node instance 120A, 120B or 120C processes the positive response. One example of processing a positive response is performing the action. Another example of processing the possible response is by forwarding the response to another application for processing.

In some implementations, a list of requested actions may be sent to an object node instance 120A, 120B or 120C for determinations of the requested actions and subsequently returns the positive and/or negative responses to the client application for further processing.

Status variable value information associated with an object node instance may be previously stored in the status repository 140 or passed by the object node instance along with the check action request.

The status information also may be based on a status schema instance derived from a design-time model. The status schema instance may include relevant status variables and associated status values, actions and conditions modeled for corresponding object nodes and stored in the status repository 140. For example, at design-time, the status schema for an object node, may define constraints for actions by describing which actions are allowed for which status values, and define which status values may be or are set after the completion of the action. At runtime, a status schema instance may be loaded from the status repository 140 by the status management runtime 130 with the current values of the status variables for object node instances.

The runtime processing component 120 illustrates a service-based approach in which services are provided by object node instances 120A-120C to other computing entities over the network 125. Examples of the network 125 include the Internet, wide area networks (WANs), local area networks (LANs), or any other wired or wireless network. As illustrated in this example, services are offered to an online client system 125A and a mobile client system 125B, which each may be a general-purpose computer that is capable of operating as a client of the runtime processing component (such as a desktop personal computer, a workstation, or a laptop computer running an application program), or a more special-purpose computer (such as a device specifically programmed to operate as a client of a particular application program). For brevity, FIG. 1 illustrates only a single online client system 125A and a single mobile client system 125B. However, actual implementations may include many such computer systems.

The architecture of system 100 illustrates a service-oriented architecture, which defines objects and relationships of objects to provide services usable by other computing systems or components. The service-oriented architecture (or portions thereof) may be developed and licensed (or sold) by a commercial software developer. The service-oriented architecture 100 is one example of a computing environment in which the described principles, concepts and techniques may be implemented. The techniques apply to other architectures and system designs, as would be understood by a person skilled in the art. The service-oriented architecture is being described to illustrate an example to help articulate the described techniques.

In another example, the described techniques may be implemented in a software application or software components that are developed and licensed (or sold) by a commercial software developer. Examples of commercial software applications include customer relationship management or sales applications, supply chain management applications, financial management applications, or human resources management applications. The applications may work in conjunction with one or more other types of computer applications to form an integrated enterprise information technology (IT) solution for a business enterprise. In some architectures, for example, a service-oriented architecture, the described techniques may be implemented in data objects and as software service components.

The architecture shown in FIG. 1 may allow for a less burdensome and more coherent state management of an object node instance by providing a status management runtime component 130. The runtime processing component 120 in some implementations may correspond to an application runtime component. Although the status management runtime component 130 is depicted as a separate runtime component from the runtime processing component 120, the status management runtime component 130 need not necessarily be a separate component. In one example, the status management runtime component 130 may be part of the runtime processing component 120. In another example, some or all of the functions described with respect to the status management runtime component 130 may be performed by the runtime processing component 120.

As a result of the architecture shown in FIG. 1, object node programmers need only to code calls to the status management runtime 130 to make sure an action is allowed to be performed, instead of having to understand, identify and account for all constraints that are based on the status of an object node instance. Additionally, by having object node status information represented in the status repository 140, the status management runtime 130 is able to use this information in a coherent manner as to not make any determination independent of an object node instance's state.

As described previously, a data object node at design-time may have multiple status variables, each status variable has a predetermined, mutually exclusive set of possible status values. At runtime, each status variable of a data object node instance has one of the possible status values, which may be referred to as the current value of the status variable. The current value of all status variables of a data object node instance may be referred to as the "current status" of the data object node instance. Alternatively, in some implementations, the current value of all status variables of a data object node instance may be referred to as the "state" of the data object node instance. In this description, the term "state" of the data object node instance generally is used to refer to the current value of all variables (both status variables and standard variables), whereas the term "current status" of the data object node instance generally is used to refer to the current value of all status variables (and not including the current value of standard variables).

Figure 3:
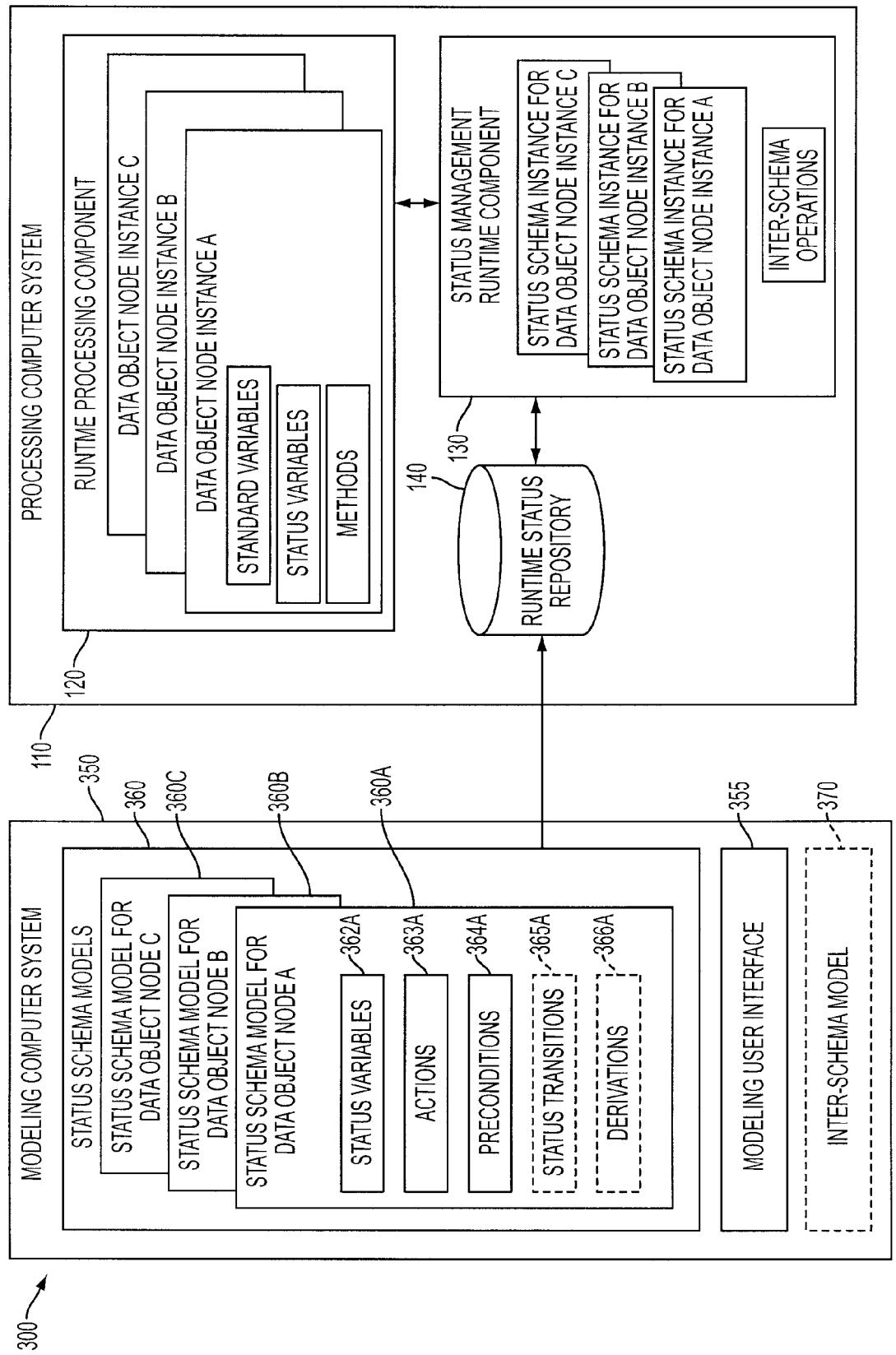

FIG. 3 shows another example of a system 300 of networked computers that uses a constraint-based model to control processing of data object node instances. The system 300, like the system 100 of FIG. 1, includes a computer system 110 having a runtime processing component 120, a status management runtime component 130, and a status repository 140. In this example, the computer system 110 may be referred to as a processing computer system 110.

The system 300 also includes a modeling computer system 350 capable of generating and presenting on a display device (or devices) a modeling user interface 355 for defining status schema models 360 for data object nodes. A data object node corresponds to one or more data object node instances, each of which is capable of being processed by the processing computer system 110. In general, once the status schema models 360 have been defined and, perhaps, simulated on the modeling computer system, the status schema models 360 are transformed into a format usable by the status management runtime component 130 and stored in the runtime status repository 140. As described previously, the status management runtime component 130 uses information in the runtime status repository 140 to determine whether the status information associated with a data object node instance permits a particular action to be performed by the data object node instance. As such, the status schema models are created in the modeling environment (here, represented by the modeling computer system) and used without modification by the runtime environment (here, represented by the processing computer system).

More particularly, the modeling user interface 355 enables a user at design-time to define a status schema model for a data object node. A data object node also is associated with a data model defining standard variables, status variables and methods for the data object node, and, therefore, for data object node instances generated for the data object node.

In general, a status schema model identifies constraints for performing an action of a data object node. More particularly, the status schema models 360 include a status schema model 360A for data object node A, a status schema model 360B for data object node B, and a status schema model 360C for data object node C. As illustrated by the status schema model 360A, each status schema model 360A, 360B or 360C, includes status variables 362A (and for each status variable, a set of predefined permissible values) and actions 363A. As shown, each status schema model includes preconditions (such as preconditions 364A for status schema model 360A). A precondition identifies how a status affects whether an action is to be performed at runtime by a data object node instance having the status. For example, a precondition may identify a condition that must be fulfilled for an action to be performed by a data object node instance corresponding to the data object node to which the status schema model corresponds. An action (such as one of actions 363A) represents a process step that can be performed on an instance of a data object node for which the status schema model corresponds.

A precondition (such as one of preconditions 364A) is a type of constraint that generally relates an action with a status value of one of the status variables 362A. A precondition may enable or inhibit an action. At runtime, the preconditions of an action are evaluated to determine whether the action is permitted to be performed on or by the data object node instance to which the status schema model relates.

Another type of constraint which may be used in some status schema models is a status transition. A status transition represents a status value of a status variable that is permitted to be set when a particular action is performed on a data object node instance corresponding to the status schema model of the data object node. The architecture 300 optionally includes status transitions 365A for status schema model 360A for object node A.

Each of status schema models 360B and 360C also include status variables, actions, and preconditions for actions (not shown). Each of status schema models 360B and 360C may include status transitions and derivations, described below (not shown).

The modeling user interface 355 also may support inter-schema modeling. For example, a status schema model for a data object node may include inter-schema modeling elements (such as derivations 366A associated with status schema model 360A). In another example, inter-schema modeling elements may be stored in a separate inter-schema model 370. Inter-schema modeling, for example, may model how a status variable in a status schema model of one data object node may influence a status variable in a status schema model of another data object node.

Two examples of such inter-schema processes are population and aggregation derivations, as described more fully later. In general, a population derivation "pushes" or copies a status value of a status variable from a parent data object node to corresponding status variables in one or more child data object nodes of the parent data object node. An aggregation derivation determines an appropriate status value of a status variable for a parent data object node based on status values of the corresponding status variable in one or more child data object nodes. The architecture 300 optionally includes derivations 366A, which may include population derivations and aggregation derivations, for status schema model 360A for object node A.

The derivations 366A in the status schema model 360A for object node A also may include one or more lifecycle (or overall) status derivations for object node A. For example, when there are several status variables in the status schema model for object node A, the model may include a status variable that reflects an overall processing status of object node A. Such an overall status variable generally is not used to determine whether a particular action is permitted to be performed on an instance of the object node, although some implementations may use the status value of the lifecycle status variable to do so.

In many cases, the modeling computer system 350 is used by software developers or programmers who are designing and implementing status schema models which correspond to data object nodes. The status schema models and data object nodes may be used, for example, to enable a service-oriented architecture for processing data that is applicable to many business enterprises. In such a case, data object nodes along with the runtime status repository that corresponds to status schema models for the data object nodes may be sold (or licensed) to many business enterprises. Thus, the processing computer system 110 may be operated and used by a different business enterprise than the business enterprise that operates and uses the modeling computer system 350.

In some implementations, the modeling computer system 350 may be used to extend, enhance or otherwise add to the status schema models corresponding to the data object nodes used in the processing computer system 110. In such a context, the modeling computer system 350 may be used by a business enterprise other than the commercial software developer who designed and implemented data object nodes or the runtime status repository. The modeling computer system 350, for example, may be operated by a software integrator or consulting organization that is implementing or enhancing the runtime processing component for a particular, or group of, business enterprises. In a more particular example, an initial runtime status repository may be generated from a first modeling computer system based on status schema models provided by the commercial software development organization that designed, implemented and sold the data object nodes used by the runtime processing component. A consulting organization may use a second modeling computer system to extend the status schema models in permitted ways for use in a particular industry or by a particular business enterprise.

Because status schema models are defined for a data object node, the models enable the definitions of business processing with a fine granularity, which may help enable or improve process flexibility and reuse of the status schema models. Also, because the status schema models reflect business logic used in runtime processes, the status schema models promote visibility and transparency of business processes, which, in turn, may reduce application development errors and programming side-effects. Also, the status schema models may result in computer-supported business processes that more accurately reflect real-world business processes, which, in turn, may help to promote the development and proper use of more accurate and easier-to-understand computer systems.

Figure 4:
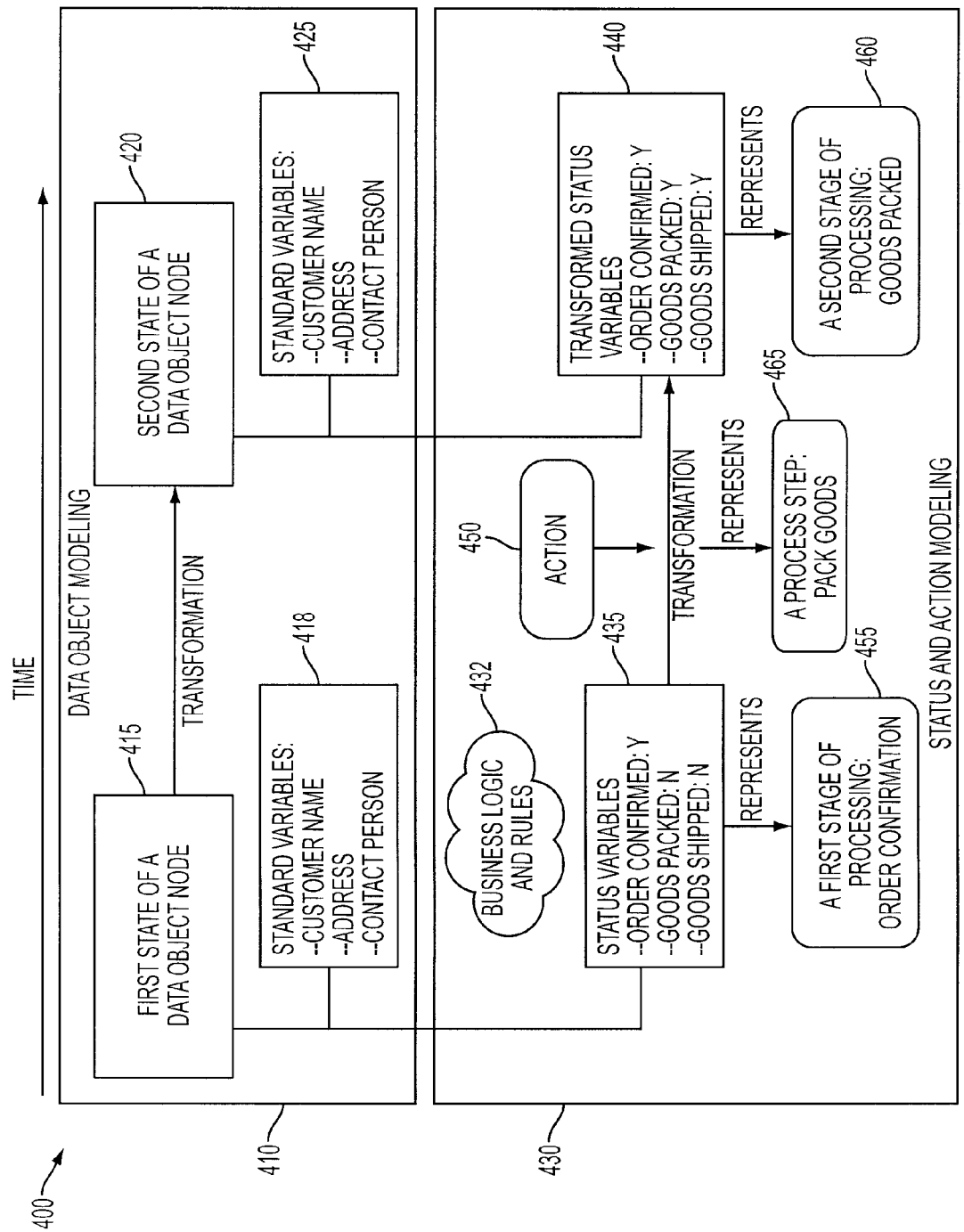
FIG. 4 is a block diagram of a status and action model architecture.

FIG. 4 depicts an example architecture 400 for a status and action model. The architecture 400 illustrates the components of one example of a status and action model in relationship to other computer system components, such as data object nodes. The component architecture 400 includes data object components 410 and status and action model components 430. In general, the component architecture 400 illustrates how a data object is transformed over time, and how the data object transformation is reflected in the status and action model.

The status and action model is an abstraction and a simplified image of real-world processes. The status and action model uses graphical representations as a means of presenting relevant aspects of the corresponding real-world processes. Here, the status and action model components 430 illustrate data objects and the execution of methods performed on the data objects during the operation of the computer system using the data objects. Stated differently, the status and action model components 430 illustrate the processing of a data object by a computer system, which generally corresponds to a real-world business process.

More particularly, while executing on a computer system, methods (or other types of computer-executable processes) change attribute values of data object nodes. The state of a data object node may be viewed as the combination of current attribute values of a data object node at a particular point in time. When an attribute value of a data object node is changed, the changing of the attribute value leads to a new state of the data object node. An attribute may be referred to as a variable, and an attribute value may be referred to as a value of a variable.

As shown in the component architecture 400, a data object node includes standard variables 418 and status variables 435. In this example, standard variables 418 relate to the data object itself and do not include status information, which is reflected in status variables 435. The standard variables are shown as part of the data object model 410 that corresponds to the status and action model component 430, whereas the status variables 435 of the data object node 415 are shown as part of the status and action model 430.

The component architecture 400 represents the transformation of a particular data object node from one state (here, called the first state 415) to another state (here, called the second state) 420, as shown in the data object model component 410. The status and action model component 430 depicts that business process step associated with the transformation of the data object node from the first state 415 to the second state 420.

As shown in the status and action model component 430, a particular action 450 results in the transformation of the status variables 435 to the transformed status variables 440. The current values of status variables (such as depicted in status variables 435 and 440) represents the state or stage of a process related to the data object node. More particularly, the current values of status variables 435 indicate that the data object node that is the subject of the component architecture model 400 represents the data object node being in the ORDER CONFIRMATION stage of processing, as indicated by stage of processing 455. Similarly, the current values of the status variables 440 of the data object node indicate that the data object node the data object node being in the GOODS PACKED stage of processing, as indicated by stage of processing 460. The transformation of the data object node from the ORDER CONFIRMATION status to the GOODS PACKED status is reflected in the transformation of the current values of the status variables 435 to the transformed values of the status variables 440, which results from the action 450. In this example, the action 450 represents a process step 465 of PACK GOODS.

As shown in this example, a status management model for a data object node illustrates the transformation of the data object node from one state to another state, as reflected in a value change to the variables of the data object node. The transformation reflects an action being performed on the data object node, which results in the change of one or more status variable values for the data object node. The action represents or corresponds to a process step performed on the data object node, and the state reflected by the values of the status variables represents or corresponds to a stage of processing. As shown, it may be said that the process step results in a change of the current stage of that the processing of the data object node. The status and action model component may be said to represent or make visible business logic and rules describing how a data object node is transformed from one state to another state, as illustrated by the business logic and rules representation 432.

Figure 5:
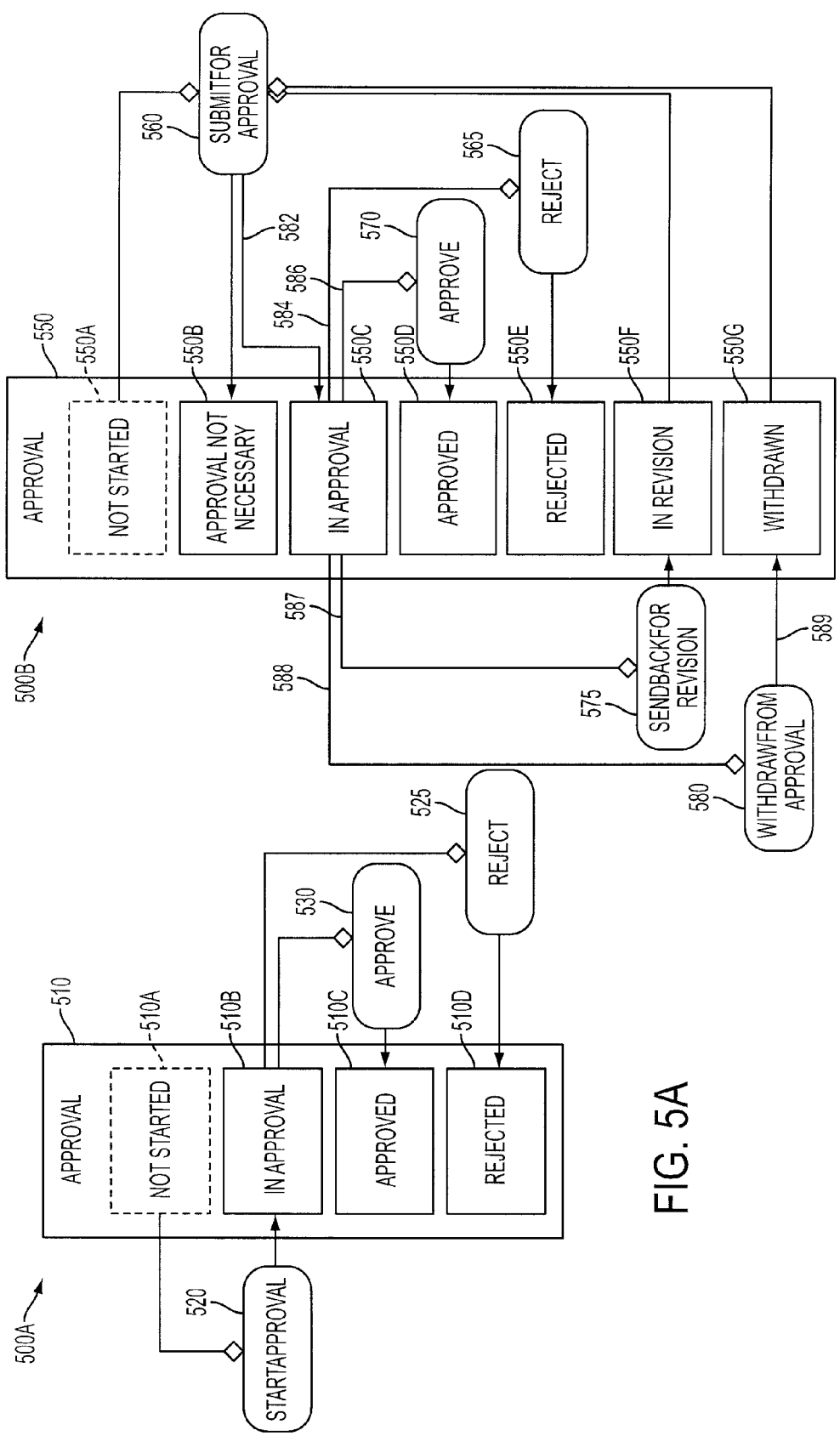
FIGS. 5A and 5B are block diagrams that depict examples of an approval status schema.

FIG. 5A depicts an example of an approval status schema 500A, which also may be referred to as an approval status schema model. The approval status schema model 500A may be defined and modified, using, for example, the modeling computer system 350 described previously with respect to FIG. 3. The approval status schema model 500A is a design-time model. Design-time status schema models may be used to show relations between an object's state and actions, which may define constraints for the actions by describing which actions are allowed for which status values, and define which status values are to be set after the completion of an action. At runtime, an approval status schema instance may be loaded, for example, from the runtime status repository 140 described previously with respect to FIG. 3, by the status management runtime component 130 with the current values of the status variables.

As illustrated, the approval status schema model 500A includes a single status variable 510 (shown as "Approval") with four possible status values 510A-510D (shown as "Not Started," "In Approval," "Approved" and "Rejected," respectively), and three actions 520, 525 and 530 (shown as "Start Approval," "Reject" and "Approve," respectively). The approval status schema model 500A may be instantiated with the initial value NOT STARTED 510A, as indicted by the dotted-line border. Approval of the action 520 (i.e., "Start Approval"), for example, causes the status value IN APPROVAL 510B to be set, which is a precondition of the REJECT action 525 and APPROVE action 530—that is, in this example, a "Reject" or an "Approve" action is not allowed unless the IN APPROVAL status value is currently set in the approval status variable 510.

As illustrated in this example, the modeled status variables and their status values represent the state of the object node. The status values represent the possible values a status variable is allowed to take up, while the status variable lists all possible allowed status values. At runtime, the status variable then specifics information about the currently valid value. The modeled actions represent the methods that may be performed on or by the object node. Whether they are allowed or not is dependent on the currently set status value associated with the object node's state. The modeled preconditions are identified by the connections (lines or edges) from status values to actions, and they represent the status value constraints allowing or permitting the actions. The modeled transitions are identified by the edges (or lines) that come out of an action and connect to a resulting status value, and they represent constraints allowing or permitting the setting of a status value following the performance of an action (for example, as triggered by an updating process). The model may also identify edges (or lines) drawn from one status value of one variable to another status value of another variable (not shown), indicating that one status change directly triggers another one. The status management runtime component 130 may adjust such other status information in the status repository 140 during application runtime when the data objects are processed.

FIG. 5B is another example of an approval status schema model 500B for a data object node. In one example, the approval status schema model 500B may correspond to a sales order node, such as sales order root 210 as described previously with respect to FIG. 2. In another example, the approval status schema model 500B may correspond to a sales order item, such as items 220A-220D as described previously with respect to FIG. 2. Associating the status schema model 500B with each item node (rather than the root node) provides a finer granularity of approval such that each item is approved separately (rather than the approval of the sales order as a whole).

The approval status schema model 500B (like the status schema model 500A) includes a single status variable 550 (shown as "Approval"). In contrast with model 500A, the approval status schema model 500B includes seven possible status values 550A-550G (shown as "Not Started," "Approval Not Necessary," "In Approval," "Approved," "Rejected," "In Revision" and "Withdrawn"), and seven possible actions 560, 565, 570, 575 and 580 (shown as "Submit For Approval," "Reject," "Approve," "Send Back For Revision," and "Withdraw From Approval," respectively). As illustrated, the approval status schema model 500B is instantiated with the initial value NOT STARTED 550A, as indicted by the dotted-line border. As illustrated, if the submit-for-approval action 560 is performed, the status value of the approval status variable 550 changes from a NOT STARTED value 550A to the IN APPROVAL value 550C, as illustrated by the edge 582 leading from the submit-for-approval action 560. The status value IN APPROVAL 550C must be set for any of the reject action 565, the approval action 570, the send-back-for-revision action 575 or the withdraw-from-approval action 580 to be performed. These preconditions for the actions 565, 570, 575 and 580 are shown by the edges 584, 586, 587 and 588 leading from the status value IN APPROVAL 550C to each of the actions 565, 570, 575 and 580. Performing any one of the reject action 565, the approve action 570, the send-back-for-revision action 575 or the withdraw-from-approval action 580 changes the status value of the approval status variable 550, which, in turn, makes the these actions 565, 570, 575 and 580 unavailable to be performed.

As illustrated, the edges (or lines) that lead into an action are preconditions that define which status values enable an action to be performed. One example of a precondition edge is edge 584 leading from the value IN APPROVAL 550C to the reject action 565. The edges (or lines) that lead from an action reflect a status transition—that is, a transformation of a status value of a status variable to another status value of the status variable. An example of a status transition is edge 589 leading from the withdraw-from-approval action 580 to the value WITHDRAWN 550G of the approval status variable 550. An edge (or line) may be drawn from a status value of one status variable to a status value of another status variable, which illustrates a status change that triggers another status change. A status change that triggers another status change may be referred to a "synchronizer."

In this example of status schema model 550, performing the submit-for-approval action 560 causes the value IN APPROVAL 550C to be set, which is a precondition of the reject action 565, approve action 570, the send-back-for-revision action 575 and the withdraw-from-approval action 580.

In comparison with status schema model 500A, status schema model 500B provides additional options during an approval process—for example, the send-back-for-revision action 575 and withdraw-from-approval action 580. The additional status value IN REVISION 550F and status value WITHDRAWN 550G of the approval status variable 550 support the more robust approval process. As would be understood by a person skilled in the art, the inclusion of more actions and predetermined status values for the approval status variable 550 in status schema model 550B does not intrinsically make this status schema model 550B preferred over the status schema model 550A. Rather, the ability to more accurately model a "real-world" business process is important—whether the "real-world" business process is more accurately represented by status schema model 500A or more accurately represented by status schema model 500B. The ability to model a business process by adding actions and status values for a status variable representing a step in business process is beneficial.

Figure 6:
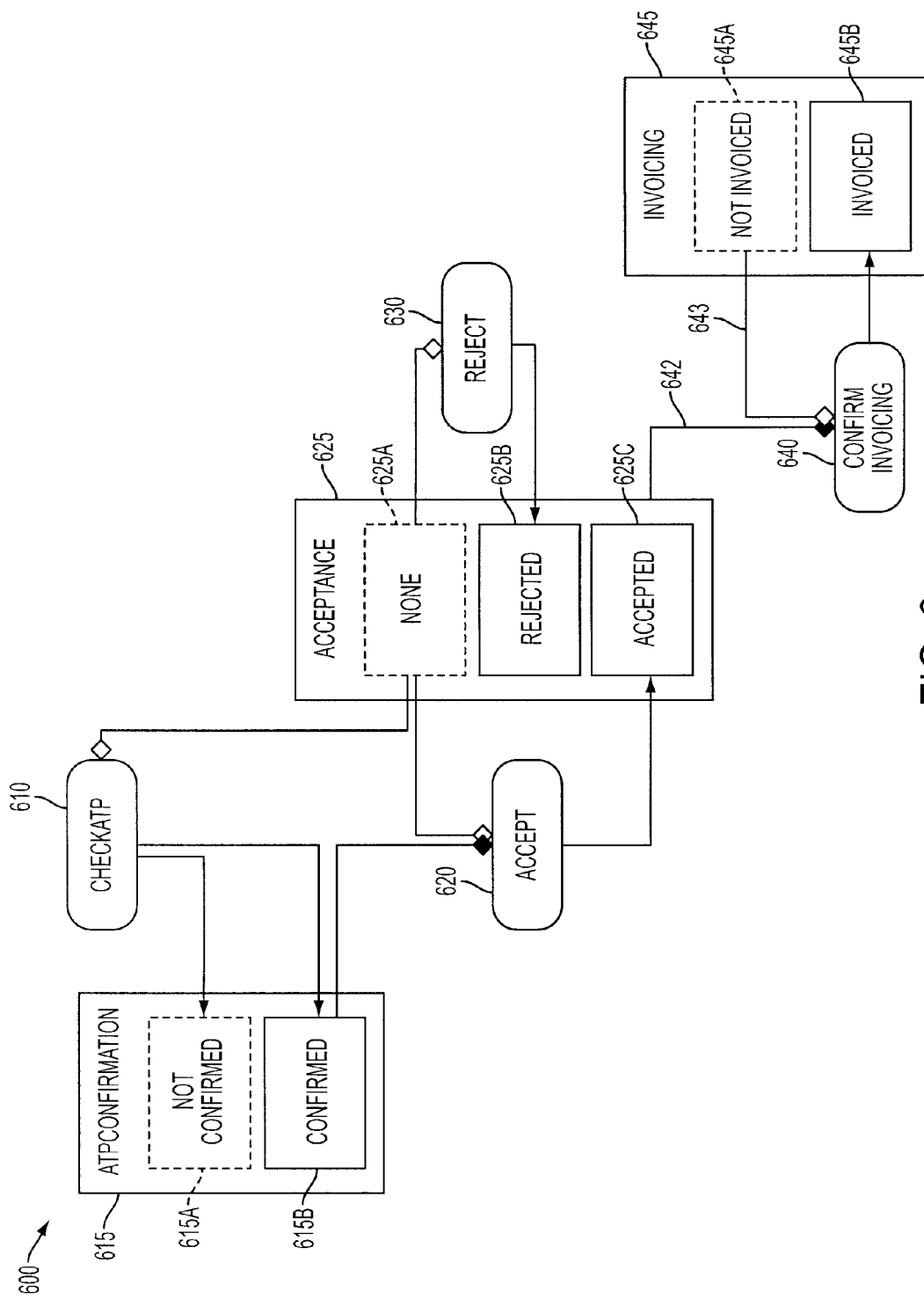
FIG. 6 is a block diagram of an example status schema model for a sales order object node.

FIG. 6 illustrates an example status schema model 600 for a sales order object node. The status schema model 600 includes a check-availability action 610 (shown as "CheckATP"), an accept action 620, a reject action 630 and a confirm-invoicing action 640. The status schema model 600 also includes an availability-confirmation status variable 615 (shown as "ATPConfirmation") having an initial status value 615A of NOT CONFIRMED and a CONFIRMED status value 615B. The status schema model 600 also has an acceptance status variable 625 having an initial value 625A of NONE, a status value 625B of REJECTED, and a status value of ACCEPTED 625C. The status schema model 600 further includes an invoicing status variable 645 having an initial status value 645A of NOT INVOICED and a status value 645B of invoiced.

In the example of status schema model 600, the confirm-invoicing action 640 should be performed only if an associated order has been accepted and an invoice has not been yet sent out. That is, the confirm-invoicing action 640 is permitted to be performed only if the current value of the invoicing status variable 645 is the status value NOT INVOICED 645A and the current value of the acceptance status variable 625 is the status value ACCEPTED 625C. The model 600 reflects these preconditions of the confirm-invoicing action 640, as shown by the edge 642 leading from the status value ACCEPTED 625C of the acceptance status variable 625 to the confirm-invoicing action 640 and by the edge 643 leading from the value NOT INVOICED 645A of the invoicing status variable 645 to the confirm-invoicing action 640.

Figure 7:
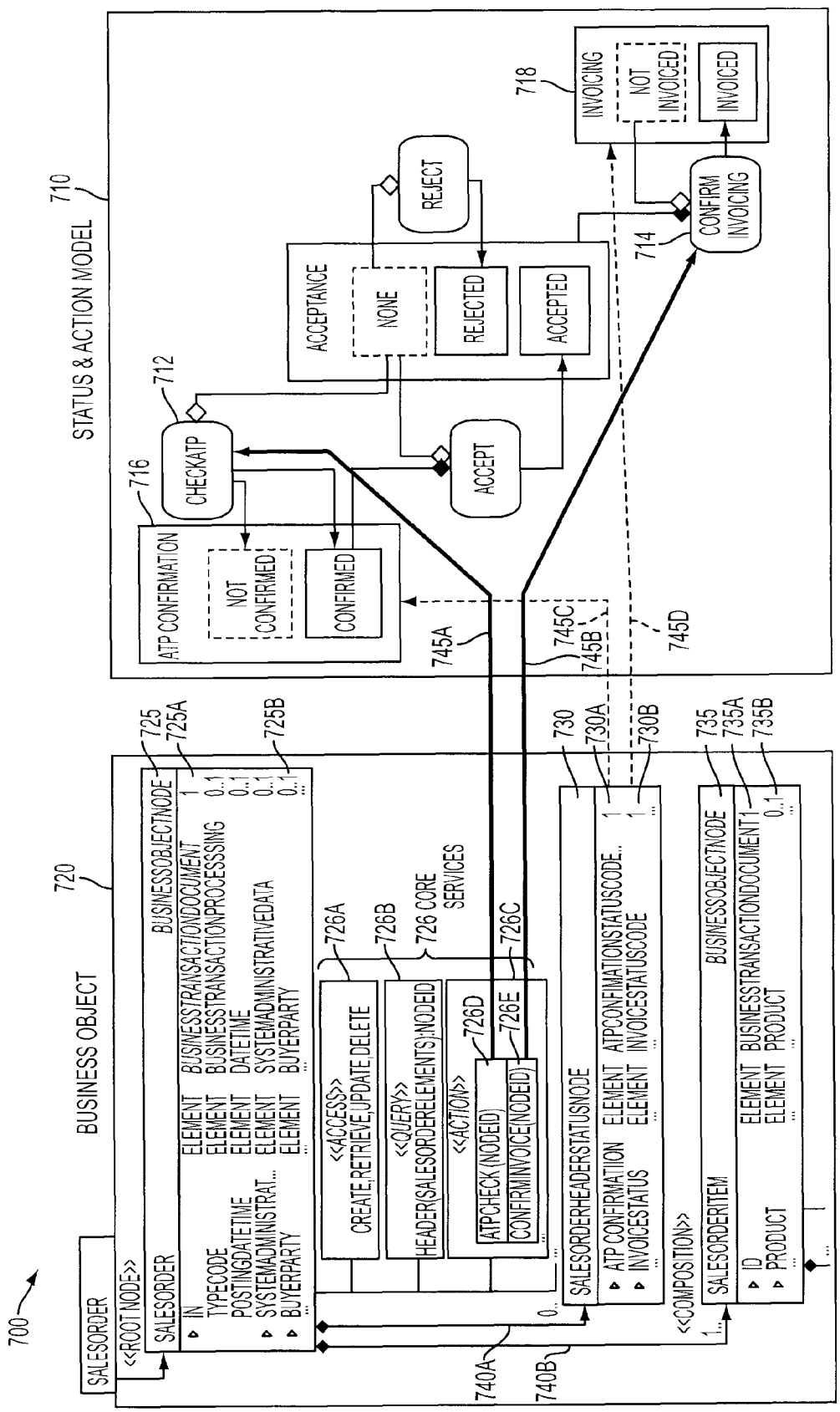
FIG. 7 is a block diagram of an architecture that includes a status and action model and a business object model.

FIG. 7 shows an architecture 700 that includes a status and action model 710 and a business object model 720, which may be a type of a data object model. In this example, the business object model 720 represents a design-time sales order object model. The business object model 720 is another example of how a sales order object may be modeled. Like the sales order modeled in FIG. 2, the sales order business object model 720 includes a business object node 725 (called "SalesOrder" and may also be referred to as a sales object node or a sales object root node). The sales object node 725 also includes a header status node 730 (called "SalesOrder HeaderStatusNode" and may be referred to as a sales status node), and, like the sales order of FIG. 2, an item node 735 (called "SalesOrderItem"). The sales object node 725 is the root node of a sales order object and includes identifying information, such as an identifier variable 725A (called "ID"), a customer identifier 725B (called "BuyerParty") as well as other variables. The sales object node 725 provides a set of core services 726, including access methods 726A, a query method 726B, and actions 726C. The actions 726C of the sales object node 725 include an availability-check action 726D (called "ATPCheck") and an confirm-invoice action 726E.

As shown through line 740A, the sales object node 725 is related to the sales status node 730, which includes an availability status variable 730A (called "ATPConfirmation") and an invoice status variable 730B (called "InvoiceStatus").

As shown through line 740B, the sales object node 725 also is related to one or more sales order item nodes 735, each of which include an identifier variable 735A, a product identifier variable 735B as well as other variables related to a sales item (not shown). The sales object node 725 may be one example of a design-time data object node model for the runtime sales item instances 220A-220D, which have been described previously with respect to FIG. 2.

The status and action model 710 may be an implementation of the status and action model 600 described previously with respect to FIG. 6. The status and action model 710 and the business object model 720 are related through actions and status variables. More particularly, in this example, the availability-check action 726D of the sales order node 725 corresponds to the check-availability action 712 in the status and action model 710, as shown through arrow 745A. The confirm-invoice action 726E of the sales order node 725 corresponds to the confirm-invoicing action 714 of the status and action model 710, as shown through arrow 745B. The availability-confirmation status variable 730A of the sales status node 730 corresponds to the availability-confirmation status variable 716 of the status and action model 710, as shown through dotted arrow 745C. The confirm-invoice status variable 730B of the sales status node 730 corresponds to the invoicing status variable 718 of the status and action model 710, as shown through dotted arrow 745D.

Figure 8:
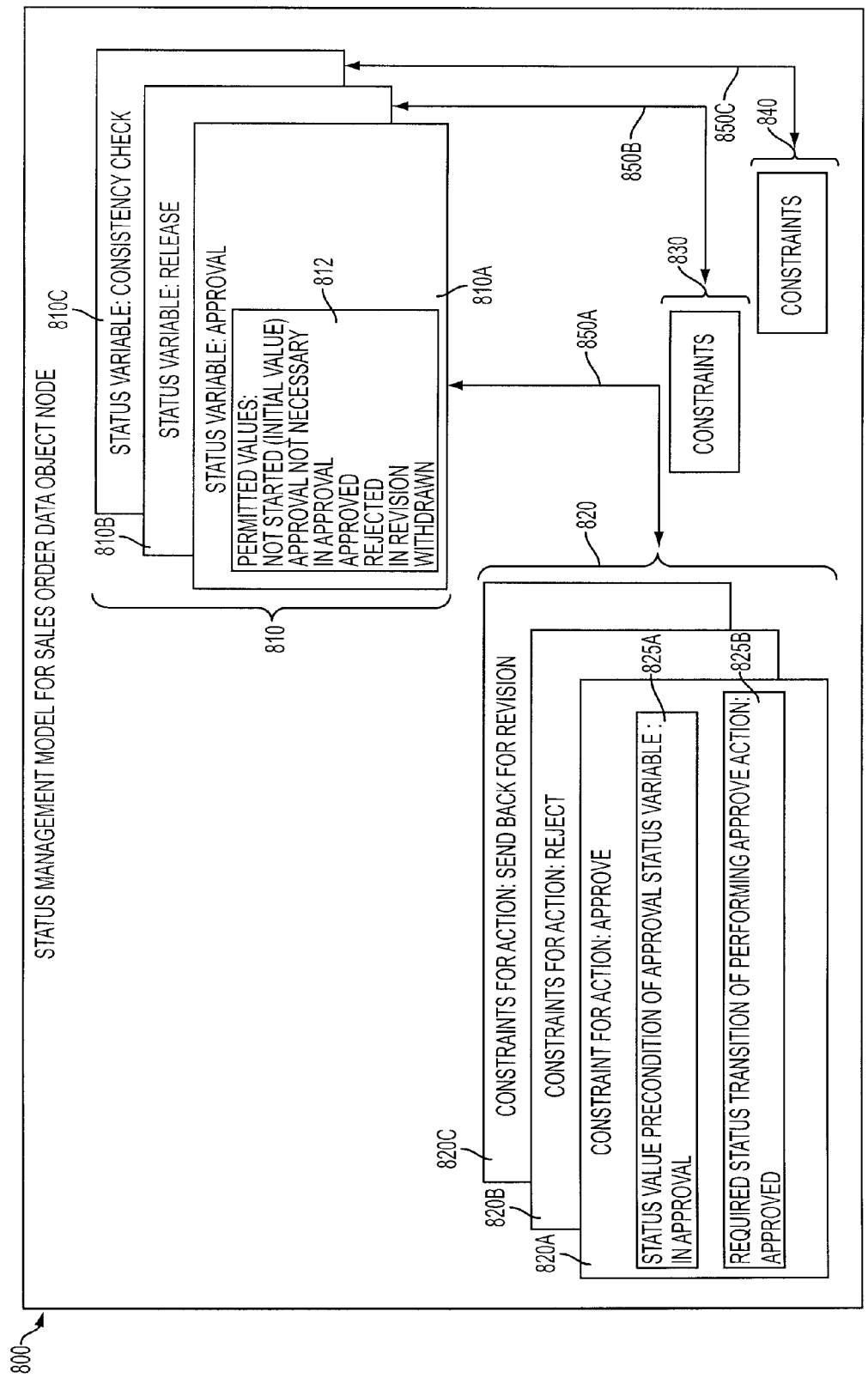
FIG. 8 is a block diagram of a conceptualized data structure of a status schema model.

FIG. 8 shows a conceptualized data structure 800, in simplified form, for a status schema model that relates status variables 810 to constraints 820, 830 and 840 for actions that may be performed on a sales order node. The data structure 800 includes three status variables: approval 810A, release 810B and consistency check 810C. The data structure 800 also identifies the status values that may be set for each status variable, as shown by values 812 for the status variable approval 810A.

In the example data structure 800, each status variable for the sales order node is related to one or more constraints for an action that may be performed by the sales order node. More particularly, constraints 820 for actions 820A, 820B and 820C are based on the current value of the approval status variable, as shown by line 850A. In particular, constraints for approve action 820A identifies a precondition 825A for the approval action (here, IN APPROVAL status value) to be permitted and a status transition 825B (to APPROVED status value) that results from occurrence of the approve action 820A. Constraints for the reject action 820B and constraints for the send-back-for-revision action 820C identify one or more preconditions (based on the approval status variable) for the action to occur and optionally may identify a status transition resulting from the action. Stylized constraints 830 identify constraints for actions based on the release status variable 810B, as represented by line 850B, whereas stylized constraints 840 identify constraints for actions based on the consistent-check status variable 810C, as represented by line 850C. The data structures of constraints 830 and 840 are structured in a similar way to the constraints 820.

Figure 9:
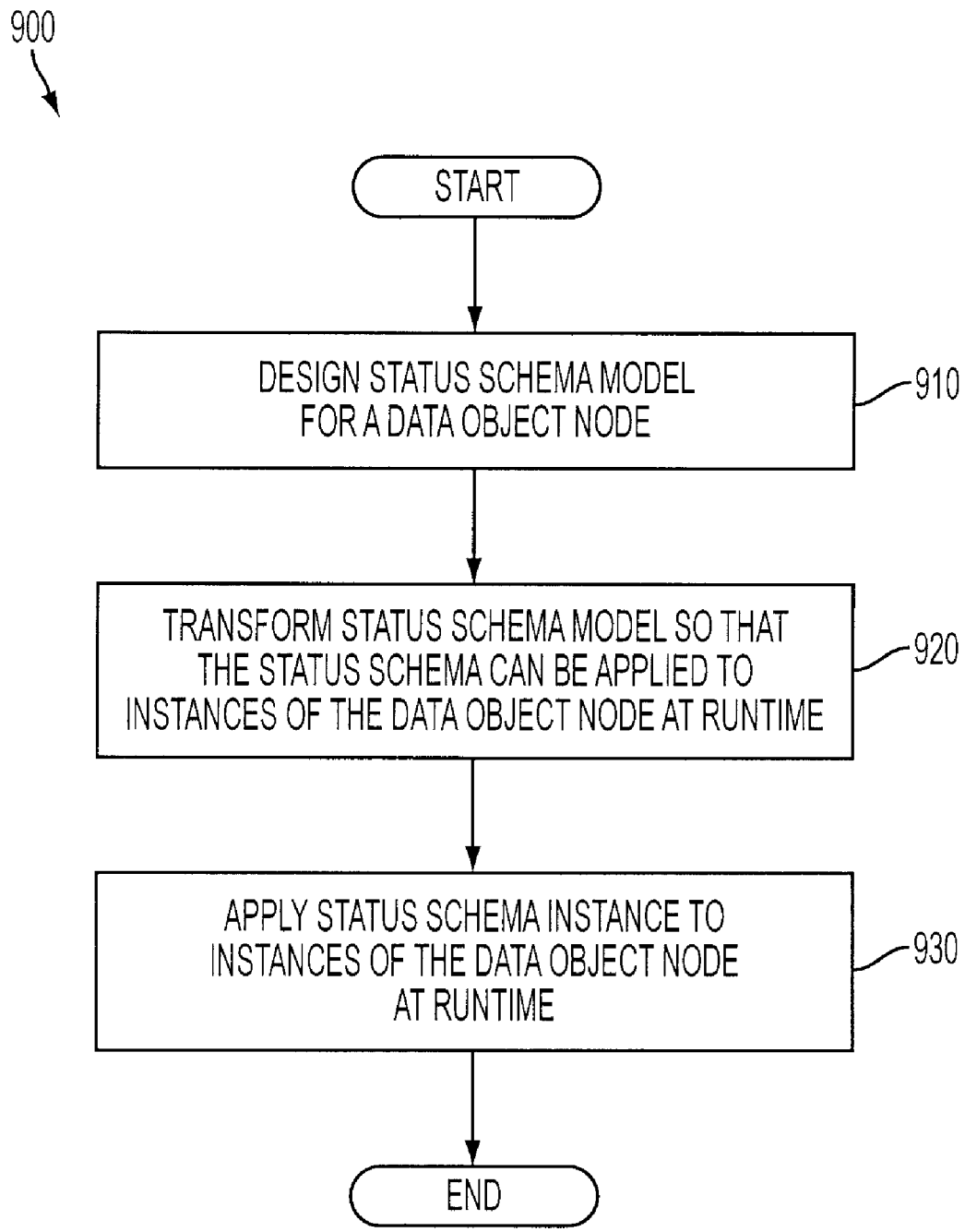
FIG. 9 is a flow chart of an example process for designing and using a status schema model.

FIG. 9 shows an example process 900 for designing and using a status schema model. The process 900 may be performed, for example, using the modeling computer system 350 and the processing computer system 110, both as described previously with respect to FIG. 3.

The process 900 includes designing a status schema model for a data object node (step 910). This step may be performed, for example, by a user of the modeling computer system 350 executing a computer program presenting graphical user interface to create and modify a status schema model. For example, a user in one or more sessions may use a graphical user interface to design, simulate and refine a status management model for a data object node, such as status and action schema models 500A, 500B and 600 of FIGS. 5A, 5B and 6, respectively.

Once designed, the status schema model is transformed such that the status schema can be applied to instances of the data object node at runtime (step 920). For example, the status schema model may be reformatted for efficient runtime access by an application runtime component or status management runtime component, as described previously with respect to FIGS. 1 and 3. The status schema model may be persistently stored, such as in a runtime status repository 140 of FIG. 1 or 3.

During runtime, the status schema instance is applied to instances of the data object node to enforce the status and action constraints specified by the status schema model. One of the advantages of this process is that the status schema model created (and refined) in step 910 is used to enforce the status and action constraints in step 930. As such, a visible status-driven process may be defined and consistently applied to data objects. While the model is transformed for use at runtime, the semantic information of the status schema model is not changed in the transformation. The status and action constraints specified by the status schema model for a data object node are applied without deviation at runtime to instances of the data object node.

In some implementations, multiple status schema models may be created for a data object node. In such a case, at runtime, one of the multiple status schema models is applied without deviation to instances of the data object node, as described more fully later.

Figure 10:
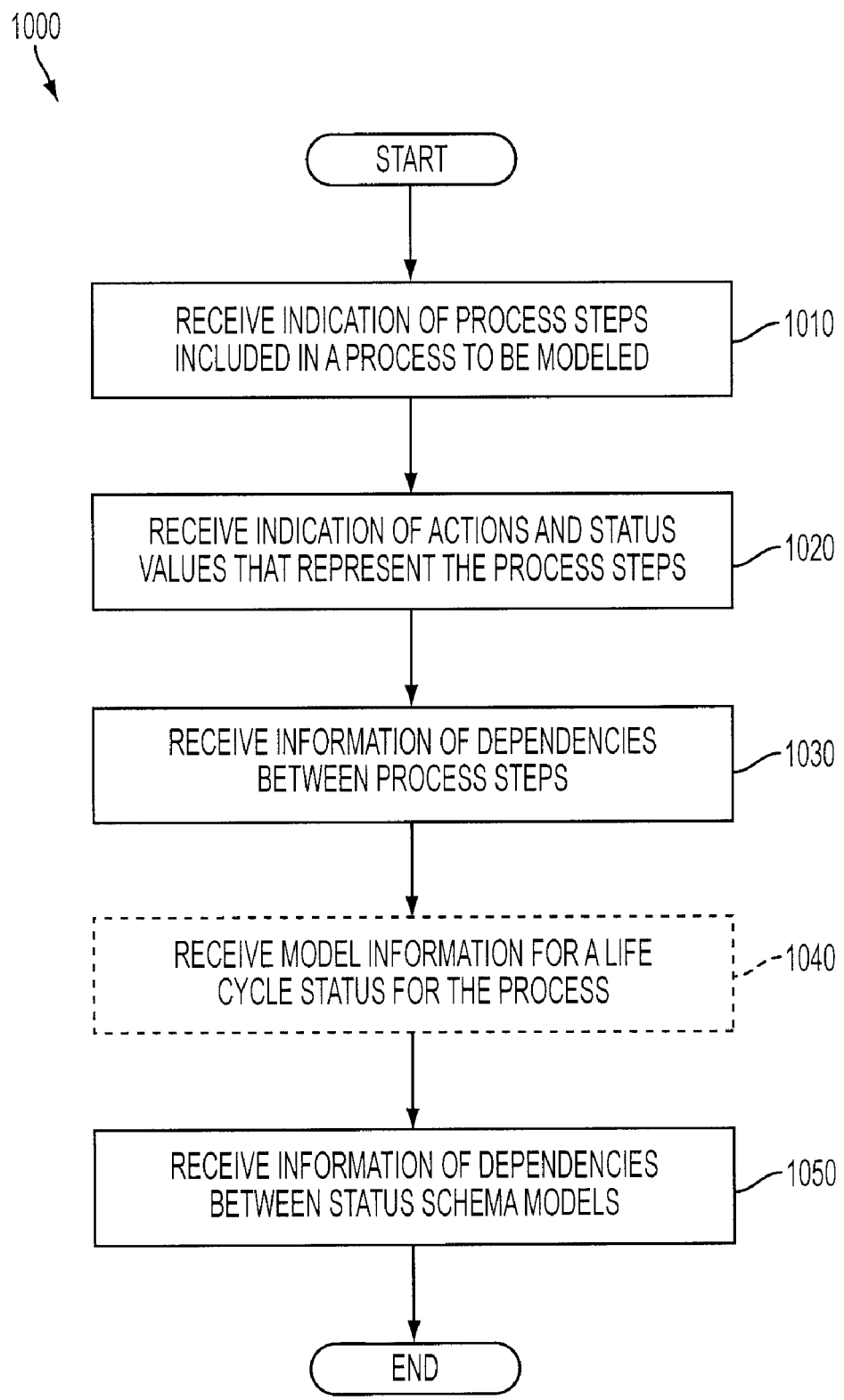
FIG. 10 is a flow chart of an example process for modeling a process in a status and action modeling computer system.

FIG. 10 illustrates an example process 1000 for modeling a process in a status and action modeling computer system. In one example, the process may be implemented by the modeling computer system 350 described previously with respect to FIG. 3. For example, computer-readable medium may be configured to perform the process 1000 when executing on a processor (or processors) of a modeling computer system.

The process 1000 begins with the receipt of an indication of the process steps to be included in a process to be modeled (step 1010). In one example, processing a sales order includes three processing steps: (1) availability check for items in the sales order to determine whether the sales order can be fulfilled, (2) communication to the buyer of acceptance (or rejection) of the sales order by the seller, and (3) creating an invoice to send to the buyer for accepted an sales order.

An indication of actions and status values that are important to, or represent, the process steps are received (step 1020). Continuing the example, the availability process step includes a check-availability action; the acceptance process step includes an accept action and a reject action; and the invoicing process step includes a confirm-invoicing action. The progress of the process steps is reflected in a status variable. In this simplified example, the availability process step includes a confirm-availability status variable having NOT-CONFIRMED and CONFIRMED status values; the acceptance process step includes an acceptance variable having NONE, REJECTED and ACCEPTED status values, and the invoicing process step includes an invoicing status variable with NOT-INVOICED and INVOICED status values. As illustrated in this example, each action associated with a process step is represented by a status value corresponding to the action. In particular, the acceptance process step has a reject action and an accept action, each of which are reflected in permitted status values for the acceptance status variable.

Information of dependencies between process steps is received (step 1030). Sometimes process steps cannot occur in parallel, and information related to the constraints between the process steps is received to be modeled. Continuing the example, a sales order can only be accepted if the availability check was successful; invoicing only occurs if the sales order was accepted; and checking availability should not be performed after the order was accepted or rejected. Stated differently, information is received that defines the preconditions and status transitions depicted model 600 described previously with respect to FIG. 6.

In some implementations, model information for a life cycle (or overall) status for the process may be received (step 1040). For example, an overall status variable that reflects the overall process stage may be defined. Continuing this example, information may be received that indicates that the process should have a life cycle status variable with possible status values of IN PREPARATION, IN ACCEPTANCE, IN EXECUTION, COMPLETED and REJECTED.

As such, the process 1000 represent an example implementation of defining a status schema model for a sales order object node. The status schema model for the data object node generally is stored in the modeling computer system for review and refinement.

In some implementations, the process 900 may include receipt of information of dependencies between status schema models (step 1050). For example, information may be received that is related to inter-schema processes, such as population and aggregation derivations, described previously with respect to FIG. 3.

Figure 11:
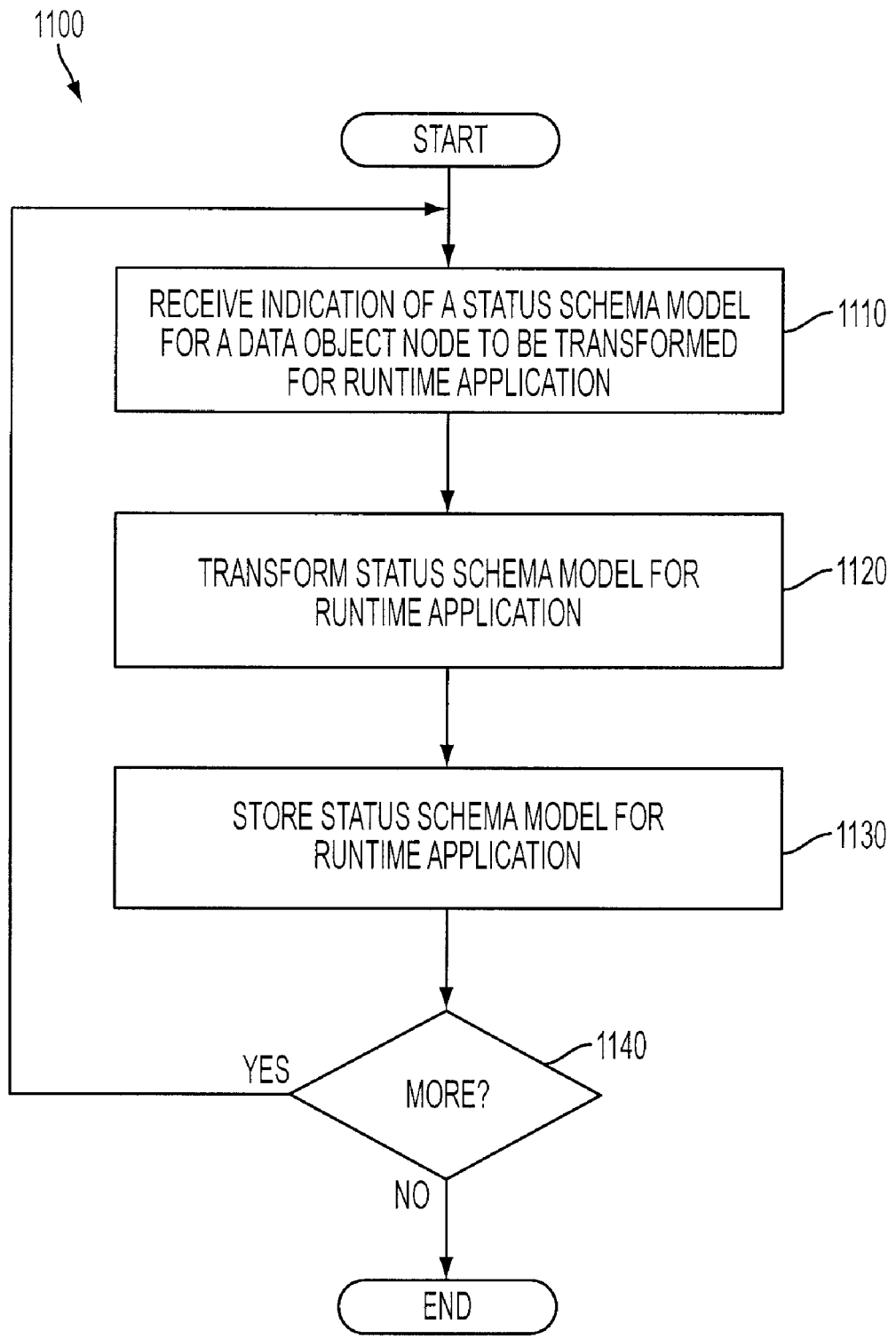
FIG. 11 is a flow chart of an example process for transforming a status schema model for application to runtime instances of a data object node.

FIG. 11 shows an example process 1100 for transforming a status schema model for application to runtime instances of a data object node, which corresponds to a status schema model. The example process 1100 may be an implementation of the transformation step 920 described previously with respect to FIG. 9. The process 1100 may be implemented by the modeling computer system 350 described previously with respect to FIG. 3.

The process 1100 begins with the receipt of an indication of a status schema model for a data object node (step 1110). The status schema model transformed by performing the process 1100 to a runtime representation of the status schema model. In one example, a user of a modeling computer system may select one of previously defined status schema models from a displayed list. In another example, the user may enter an identifier of a particular status schema model. In yet another example, the transformation process 1100 may be performed sequentially to, or as part of, a process to design a status schema model for a data object node. In such a case, for example, the indication may be programmatically received by the processor executing the process 1100.

The status schema model for the data object node is transformed (step 1120) and stored for runtime use (step 1130). For example, the status schema model may be transformed from a modeling format to a format usable by a runtime component, such as the runtime processing component 120 or the status management runtime component 130, described previously with respect to FIG. 1. The transformed status schema model may be stored, for example, in a runtime status repository, which may be an implementation of repository 140 described previously with respect to FIG. 1 or 3. In some implementations, additional status schema models may be identified for transformation and storage (step 1140).

Figure 12:
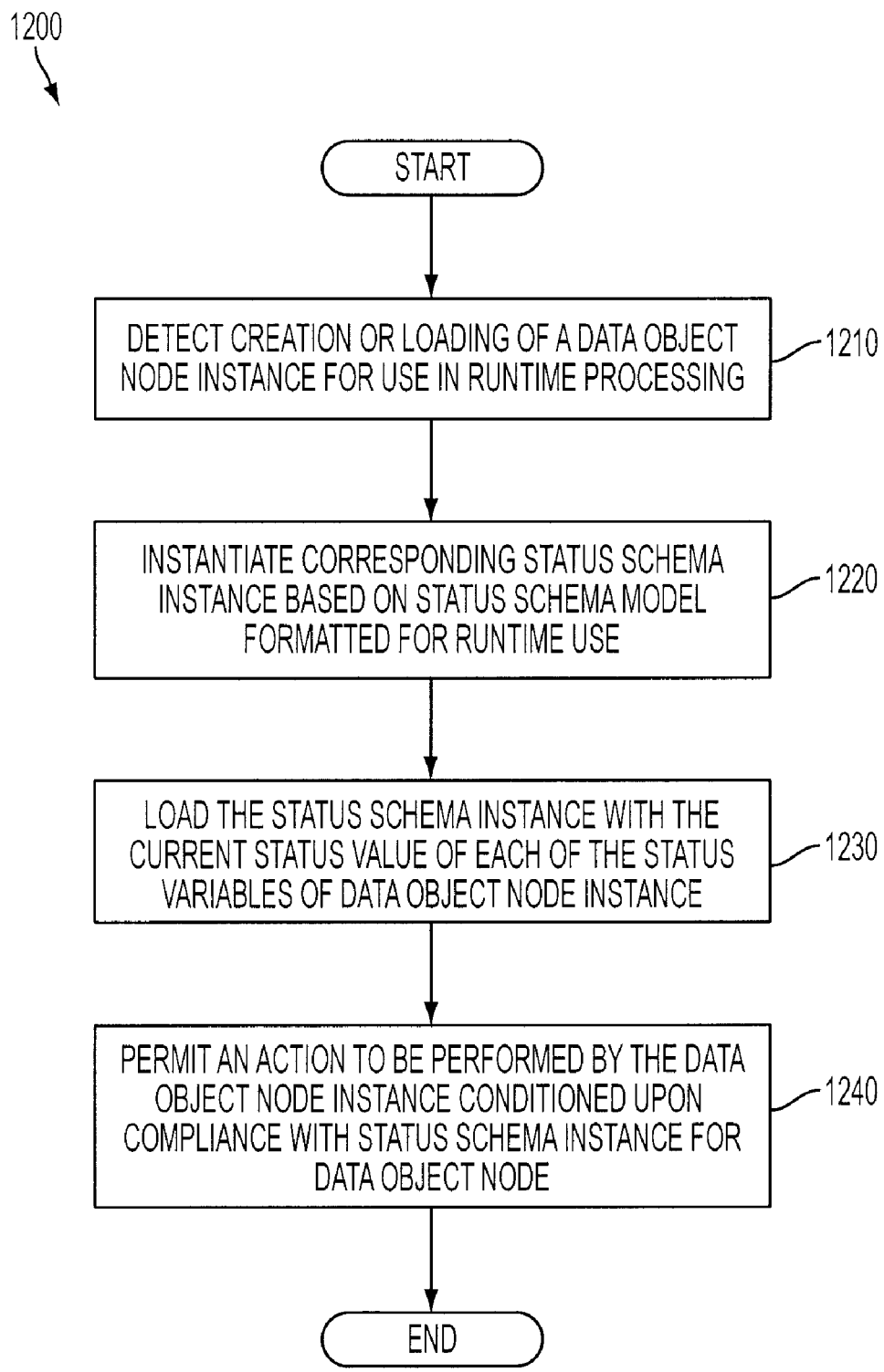
FIG. 12 is a flow chart of an example process for applying a status schema model to an instance of a corresponding data object node instance.

FIG. 12 illustrates an example process 1200 for applying a status schema model to an instance of a corresponding data object node instance. The example process 1200 may be an implementation of the application step 930 described previously with respect to FIG. 9. The process may be implemented in computer-readable medium that is executed by, for example, a processor of the processing computer system 110 described previously with respect to FIG. 3.

The process 1200 begins when the processor implementing the process 1200 detects creation of a data object node instance or detects loading of a previously created data object node instance (step 1210). The processor instantiates (or creates) a status schema instance corresponding to the status schema model for the data object node of the same type as the detected data object node instance (step 1220). For example, a sales order node instance is created by a processing computer system in response to a sales order being placed by a customer. A status schema model for a sales order node is accessed, for example, from the runtime status repository 140 described previously with respect to FIGS. 1 and 3. The status schema model for a sales order node is used to create an instance of the sales order node status schema.

The processor loads the status schema instance with the current status value of each of the status variables of the data object node instance (step 1230). Continuing the example, the status variables in the instance sales order status schema are set to the same status values of corresponding status variables in the sales order node instance. When the creation of sales order node instance is detected in step 1210, the instance of the sales order node status schema includes the default status values for the status variables.

The processor permits an action to be performed by the data object node instance conditioned upon compliance with the status schema instance for the data object node (step 1240). For example, the processor may determine whether an action may be performed by the sales object node instance by evaluating preconditions included in the sales order node status schema instance.

Figure 13:
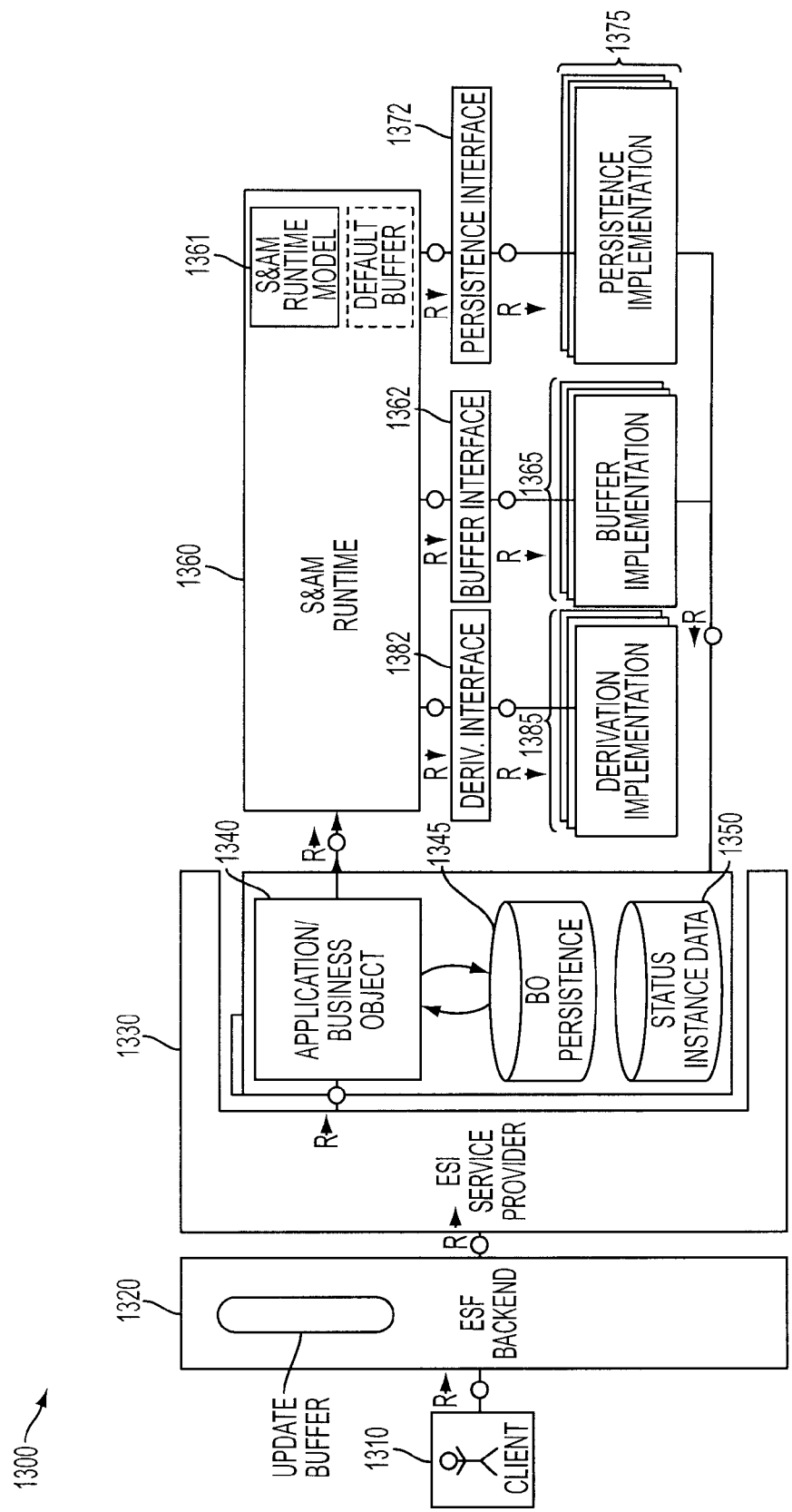
FIG. 13 is a block diagram of an example runtime architecture for status management.

FIG. 13 depicts an example of a runtime architecture 1300 for status management within an enterprise services implementation. In general, the runtime architecture 1300 includes an enterprise services layer, an application layer, and a status management runtime layer. The entities in the status schemas correspond to external representations in the enterprise services layer. The application layer implements the services modeled in the enterprise services layer. To perform tasks related to status information (such as checking whether an action is allowed and setting a status value as a result of performing an action), the application layer uses the status and action management (S&AM) runtime component. The application layer also provides services to the status and action management runtime component, such as performing a process to determine status derivations or other inter-schema processes.

More particularly, a client 1310 accesses enterprise services externally provided to clients, which communicate with the enterprise services framework backend 1320, which, in turn, interfaces with the enterprise services provider interface 1330. The enterprise services provider interface 1330 addresses an application through application/business object 1340. The application layer also includes a repository of persisted business object instances 1345 and optionally a status instance data repository 1350. In some implementations, the business object instances include status variables, which are used to set status values in corresponding variables of status schema instances. Additionally or alternatively, an application layer may store status variables for business objects separately, for example, in a status instance data repository 1350. At runtime, the status schema instance is instantiated and status values set based on the current status values of status variables, whether the status variables are persistently stored with business objects or in a separate status repository. In some implementations, a status schema instance for a data node instance may be persistently stored and loaded into memory at runtime.

The application/business object 1340 accesses the status and action management runtime component 1360, which includes the status and action management runtime model 1361 having status schema models usable at runtime. The status and action management runtime component 1360 includes a buffer interface 1362 to a buffer implementation 1365, which is a runtime representation of status schema instances. The status and action management runtime component 1360 also includes a persistence interface 1372 to a persistence implementation 1375 of status schema instances. The persistence implementation 1375, for example, may map status tables (such as name-value pair tables) of the status and action management runtime component 1360 to the database tables of the application data. The status and action management runtime component 1360 optionally may include a derivation interface 1382 to a derivation implementation 1385. The derivation interface 1382 provides a standardized manner for the runtime to access derivation processes, or other types of inter-schema processes.

A status derivation is one type of element that may be defined in a status schema model for a data object node. A status derivation is a runtime operation that reads the current status values of one or more source status variables and, based on them, determines the new status value of one or more target status variables.

A status derivation is useful, for example, when a status schema for a data object node includes many status variables and an overall status variable summarizing other status variables is desirable. In one example, for a delivery item, there might be status variables for picking, packing, and document printing. Then, an overall status variable may be desirable to indicate whether the overall status of delivery is "started," "in progress," or "finished." In such a case, a status derivation may be used to determine the status value of such overall status variable (which may be referred to as a life cycle status variable). For example, the status derivation may read the current values of the status variables for picking, packing and document printing and, based on these values, determine a status value of the overall status variable.

In the above delivery example, the overall status derivation operates on status variables application to one status schema model for a data object node. A different type of status derivation may also be used, such as a status derivation that crosses the schema boundary to operate using status variables from more than one status schema model. For example, for deliveries of more than one item, each of the items may have its own status schema instance and a root status schema instance may collectively represent the overall deliveries, as described previously with respect to FIG. 2. Then, the root instance may have a status variable showing progress of the delivery as a whole, such as by setting the root status value to FINISHED once all delivery items have been delivered. This may be accomplished by a status derivation that monitors each status schema instance for its delivery status and, based on that, determines the value of the status variable of the root status schema instance.

As explained above, status derivations of differing types may be available. In the example of FIGS. 14-23, the status schema modeling support three types of status derivations: an overall (or life cycle) status derivation, a status aggregation and a status population.

Figure 14:
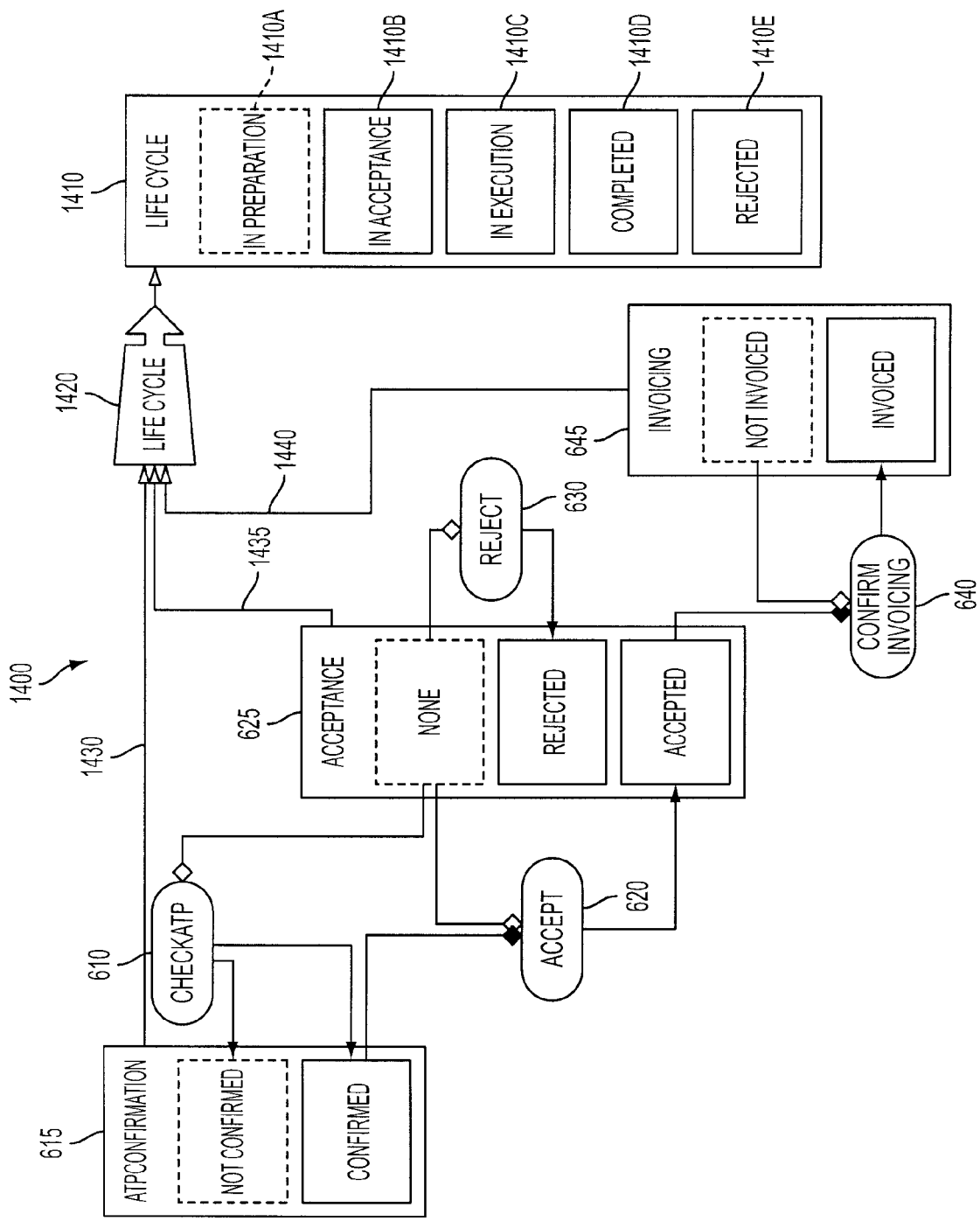
FIGS. 14, 18, 19, 20 and 22 are block diagrams illustrating status derivation models.

More particularly, FIG. 14 illustrates an example status schema model 1400 for a sales order object node that includes a life cycle status variable 1410 and an overall status derivation 1420 (shown as "LifeCycle"). The status schema model 1400 includes a check-availability action 610 (shown as "CheckATP"), an accept action 620, a reject action 630 and a confirm-invoicing action 640, as did the example 600 described previously in FIG. 6. The status schema model 1400 also includes an availability-confirmation status variable 615, an acceptance status variable 625 and an invoicing status variable 645. In the example of the status schema model 1400, the status variables 615, 625 and 645 represent various processing stages of a sales order.

The life cycle status variable 1440 represents the overall status of a sales order. The value of life cycle status variable 1440 is determined by the overall status derivation process 1490. The overall status derivation 1420 generally uses the current status values of all source status variables located in a single status schema instance and based on the collected values, determines the value of a target status variable located in the same status schema instance.

More particularly in the example of status schema model 1400, the overall status derivation process 1490 accesses or collects the currents status values of availability-confirmation status variable 615, an acceptance status variable 625 and an invoicing status variable 645, as illustrated by arrows 1430, 1435 and 1440 leading from the status variables 615, 625 and 645 to overall status derivation 1420. Then, overall status derivation process 1490 determines the value of life cycle status variable 1410, based on the accessed or collected values of the status variables. In the example of status schema model 1400, the process of resolving the collected status values to determine the status value of the life cycle status variable 1410 is not shown. However, in some implementations, the process of resolving the collected status values may be depicted or modeled.

FIG. 15 illustrates an example table 1500 showing how overall status derivation process 1490 in FIG. 14 determines the value of life cycle status variable 1410, based on the values of availability-confirmation status variable 615, an acceptance status variable 625 and an invoicing status variable 645. The overall status derivation process 1490 is designed to determine the value of the life cycle 1410 status variable such that that the life cycle 1410 status variable accurately represents the processing stage of a sales order.

For example, if a sales order has not been processed at all, that is, if availability-confirmation status variable 615, an acceptance status variable 625 and an invoicing status variable 645 respectively have the values of NOT CONFIRMED, NONE AND NOT INVOICED, the overall status derivation process 1490 determines the value of status life cycle status variable 1410 to be IN PREPARATION, as shown by row 1510 of table 1500.

If availability-confirmation status variable 615 has a status value of CONFIRMED and the acceptance status variable 625 has a value of NONE, then overall status derivation process 1490 determines the value of life cycle status variable 1490 to be IN ACCEPTANCE, as shown by row 1520 of table 1500.

If availability-confirmation status variable 615 has a status value of CONFIRMED, the acceptance status variable 625 has a value of ACCEPTED, and the invoicing status variable 645 has a value of NOT INVOICED, then the overall status derivation process 1490 determines the value of life cycle status variable 1410 to be IN EXECUTION, as shown by row 1530 of table 1500.

If the sales order has been completely processed as reflected in the availability-confirmation status variable 615, the acceptance status variable 625 and the invoicing status variable 645 respectively have the values of CONFIRMED, ACCEPTED and INVOICED, then the overall status derivation process 1490 determines the value of life cycle status variable 1410 to be COMPLETED, as shown by row 1540 of table 1500.

If an acceptance status variable 625 shows that the sales order has been REJECTED, then the overall status derivation process 1490 determines the value of life cycle status variable 1410 also to be REJECTED, as shown by row 1550 of table 1500.

Figure 16:
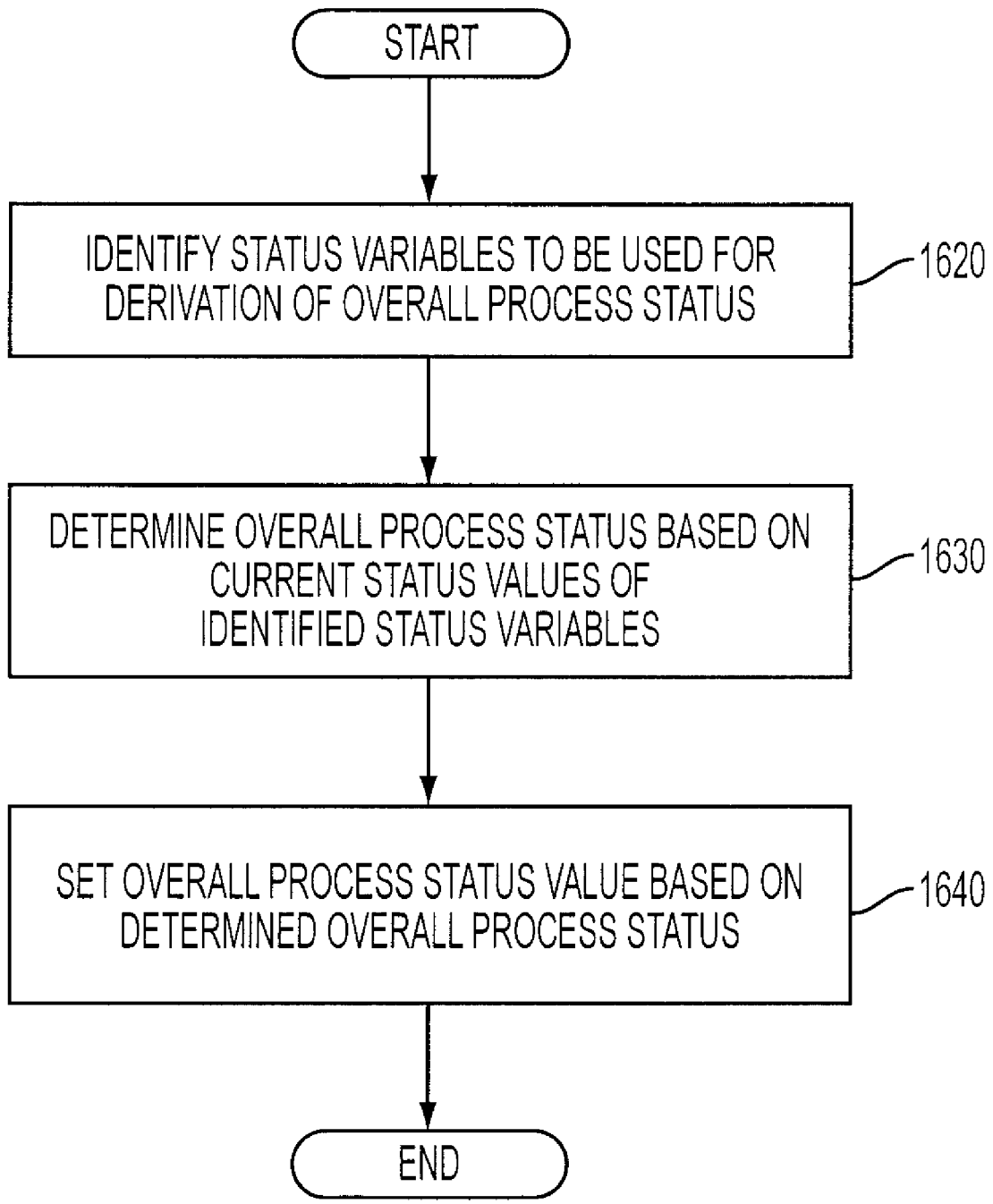
FIG. 16 is a flow chart of a process of overall status derivation.
Figure 17:
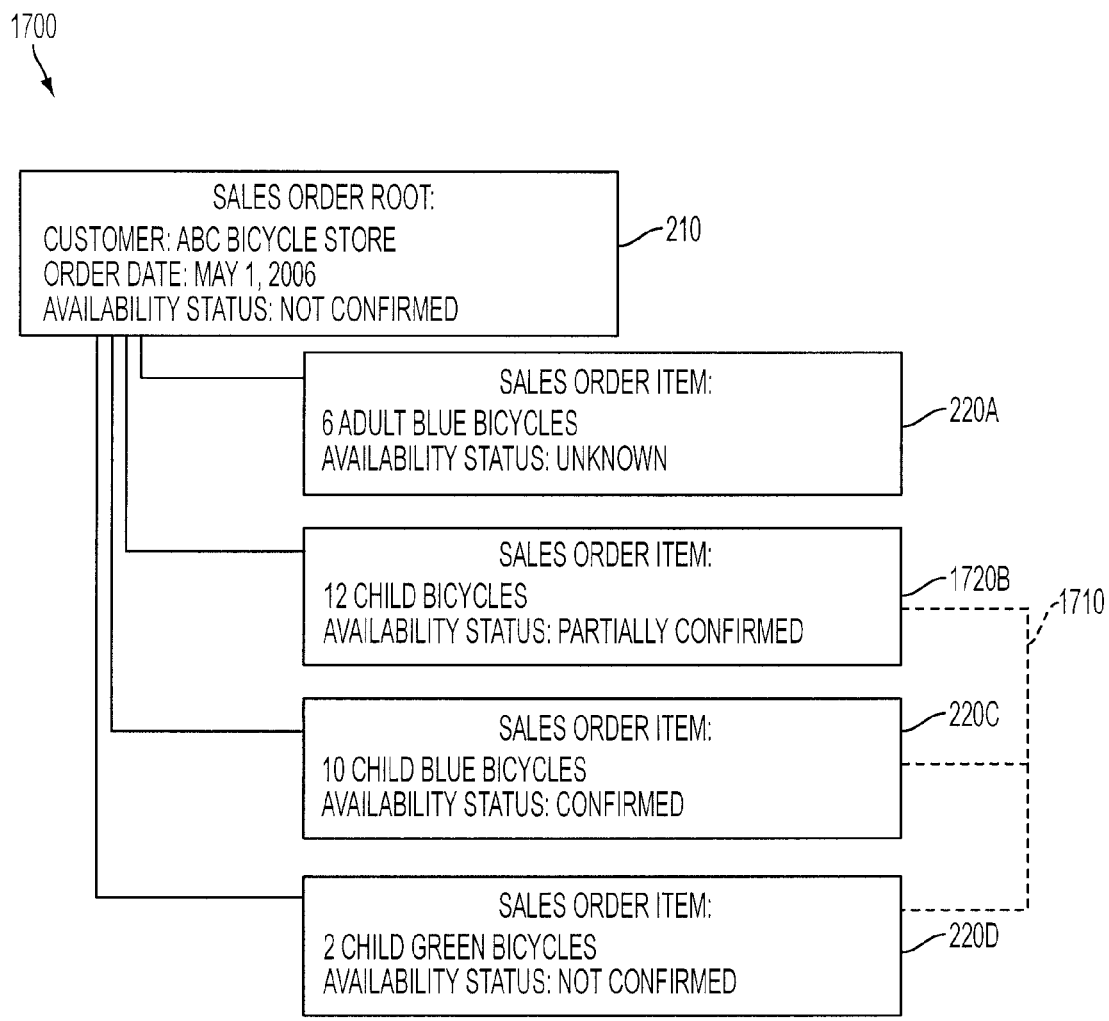
FIG. 17 illustrates an example of sales order node instance.

FIG. 16 illustrates a flow chart of a process 1600 of the derivation of an overall process status. The process 1600 may be performed at runtime. In one example, the process 1600 may be performed at runtime by one or more processors of the computer system 110 of FIG. 1 or the processing computer system 110 of FIG. 3.

The system performing the process 1600 identifies source variables to be used for the derivation of the overall process status (step 1620). This may be accomplished by the system accessing the runtime representation of the status schema model for a data object node instance.

The system determines an overall process status based on the current status values of the identified source status variables (step 1630). The determination process may be executed by the data object node instance. Some implementations may include techniques for modeling the determination process and generating a runtime representation that may be used, or executed, at runtime.

The system sets the value of the overall process status variable based on the determined value determined (step 1630) and the process 1600 ends.

Some types of status derivations may also operate using multiple status schema models—which may be said to operate "beyond the schema boundary" or be "cross-schema status derivations." In one example, a status derivation may copy the value of a source status variable in a root status instance (or parent instance) to one or more source status variables in one or more item schema instances (or child instances). In another example, a different type status derivation may determine the value of a target status variable located in a root schema instance (or parent instance) based on the current values of one or more source status variables located in item schema instances (or child instances).

Like the runtime sales order node instances illustrated in FIG. 2, the example of runtime sales order node instances 1700, collectively represent a sales order by a customer (i.e., "ABC Bicycle Store") for products (i.e., bicycles) and include a sales order root instance 210 that is related to sales order item instances 220A, 1720B, 220C and 220D. Unlike FIG. 2, the item instances 1720B, 220C and 220D are associated to one another, as illustrated by dotted-line associations 1710. In this example, item instances 220C and 220D are child nodes of item 1720B. More particularly, item 1720 is an item for twelve child bicycles and is a parent node for item 220C for ten child blue bicycles and for item 220D for two child green bicycles. Item 220A is an item for six adult blue bicycles and is not a child of the item 1720B. As such, item instances 1720B, 220C and 220D may be said to be of a subtype "child bicycle," whereas item instance 220A may be said to be of a subtype "adult."

In one respect, the hierarchy of the schemas between the status schema instance for the root node instance 210 and status schema instances for item node instances 220A, 1720B, 220C and 220D may be said to reflect a composition hierarchy in which all of the item node instances 220A, 1720B, 220C and 220D reflect to the root node instance 210. Alternatively, the hierarchy of the schemas between the status schema instance for the root node instance 210 and status schema instances for item node instances 1720B, 220C and 220D may be said to reflect an associative hierarchy or a sub-type hierarchy where the root node instance 210 relates to sub-type node instances of adult (not shown) and child (item 1720B), whereas the adult item instance relates to item node instance 220A and the child item instance 1720B relates to item node instances 220C and 220D. Some implementations may specify a particular type of hierarchy (such as a composite hierarchy or associative hierarchy) to be used for cross-schema status derivations. Alternatively or additionally, some implementations may allow the type of hierarchy to be selected during the model design process for use with a particular cross-schema status derivation.

In the particular implementation illustrated in FIGS. 18-23, the following schema relationship rules are applicable for cross-schema status derivation. First, every schema node has at most one parent node. Second, a node can have any number of child nodes. The child nodes can be the same or different node types than the parent node, as long as the nodes are within the same business object instance. Third, the status derivation hierarchy must be within the same business object instance. However, the hierarchy may reflect either the composition hierarchy or an association hierarchy of the business object instance.

Figure 18:
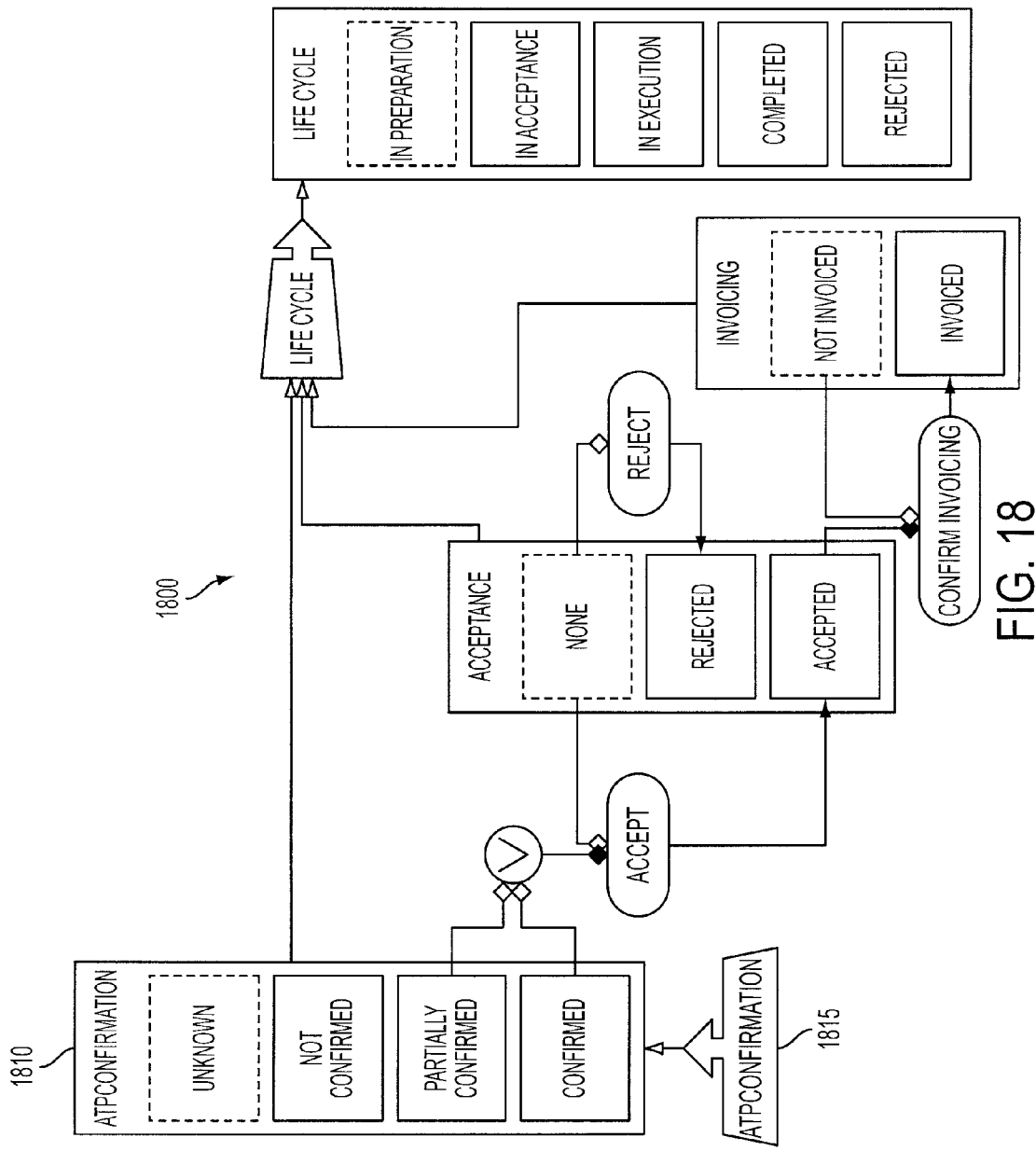

FIG. 18 illustrates sales order root schema model 1800 with a status aggregation. A status aggregation is a type of status derivation that determines the value of a target status variable in a parent node based on the current values of source status variables in one or more child nodes. In a graphical representation of the nodes, the same status aggregation symbol is shown in the parent schema node and the child schema node. In the parent schema, the status aggregation is connected to the target status variable. In the child schema, it is connected to the source status variable.

The sale order model 1800 is similar to sales order model 1400 as described previously with respect to FIG. 14. In contrast to FIG. 14, the availability-confirmation status variable 1810 is determined based on the outcome of check-availability action 610 of FIG. 14. In sales order root schema model 1800, the value of status variable confirm-availability status variable 1810 is determined by a status aggregation 1815. In this example, status aggregation 1815 collects the current values of confirm-availability status variables in sales order item schema instances (not shown) and, based on the collected values, determines the value of confirm-availability status variable 1810 in the root schema 1800.

Figure 19:
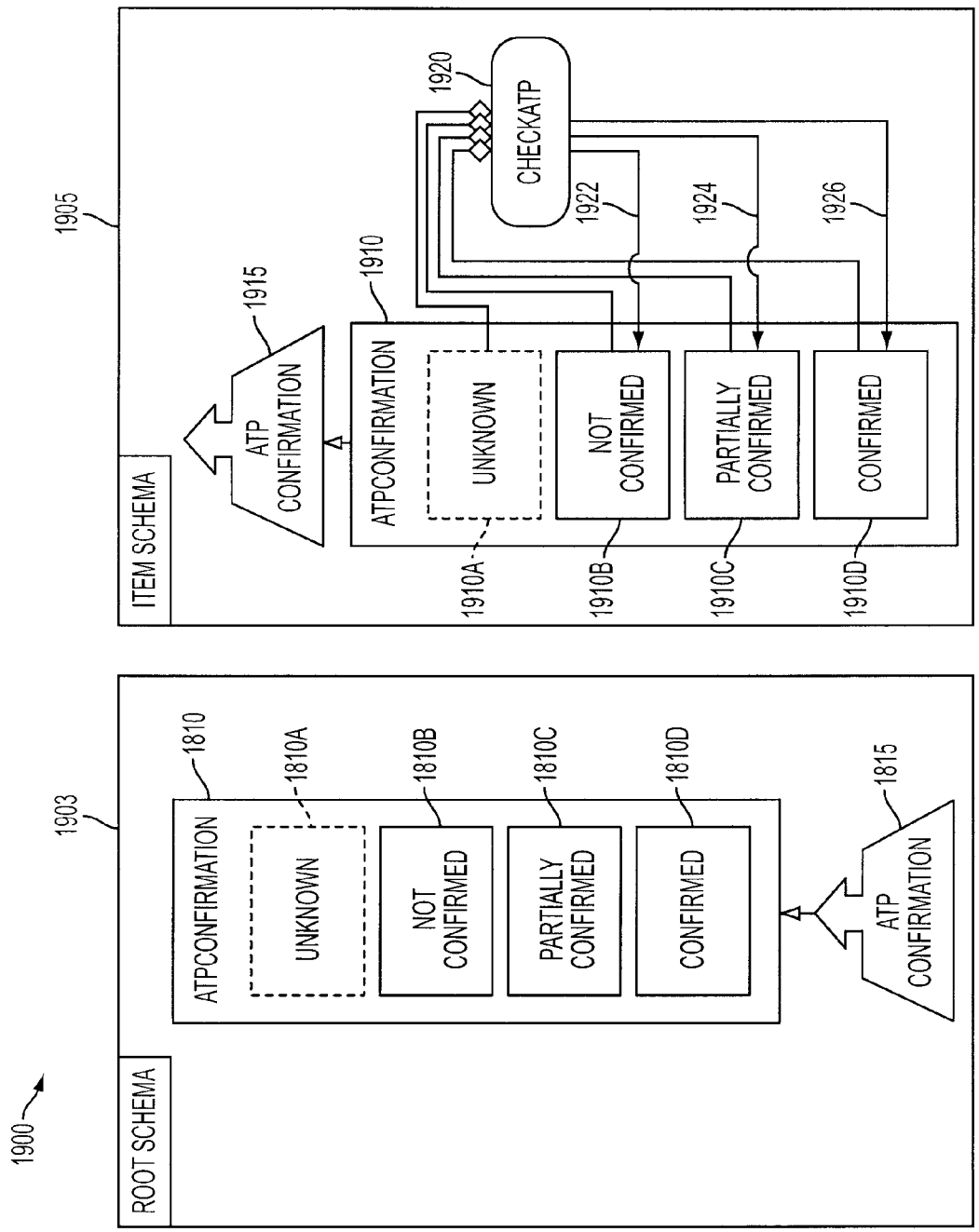

FIG. 19 illustrates relationship 1900 between an example status aggregation performed with a status schema instance for a root node instance 1903 and status schema instances for item node instances 1905. More particularly, FIG. 19 illustrates how status aggregation 1815 in FIG. 18 determines the value of confirm-availability status variable 1810 in a root schema 1903 based on the value of confirm-availability status variable 1910 in an item schema 1905. In this example, status variable confirm-availability status variable 1910 in the item schema 1905 may have the status values of UNKNOWN 1910A, NOT CONFIRMED 1910B, PARTIALLY CONFIRMED 1910C or CONFIRMED 1910D. The initial value of confirm-availability status variable 1910 is UNKNOWN 1910A, as represented by a dotted block. Based on the outcome of check-availability action 1920, confirm-availability status variable 1910 may have one of the status values of NOT CONFIRMED 1910B, PARTIALLY CONFIRMED 1910C and CONFIRMED 1910D, as represented by status transitions 1922, 1924, and 1926.

In this example, the value of status variable in the item schema 1905 affects that value of status variable in the root schema 1903 through status aggregation 1815. Generally, at runtime, there may be more than one item schema instances (based on the same status schema model), each item schema instance includes confirm-availability status variable 1910. Status aggregation 1815 collects current values of these status variables 1910 in item schema instances 1905 and determines the value of confirm-availability status variable 1810 in the root schema instance 1903. The status aggregation 1915 represented in the item schema 1905 is the same process as the status aggregation 1815 represented in the root schema 1903. The status aggregation is depicted in each schema 1903 and 1905 to represent that the portions of the status aggregation applicable to each schema. For example, the status aggregation 1915 represents that the confirm-availability status variable 1910 in item schema affects the corresponding confirm-availability status variable 1810 in the root schema 1903. The status aggregation 1815 represents that the confirm-availability status variable 1810 in the root schema 1903 is affected by the confirm-availability status variable 1910 in item schema 1905.

Figure 20:
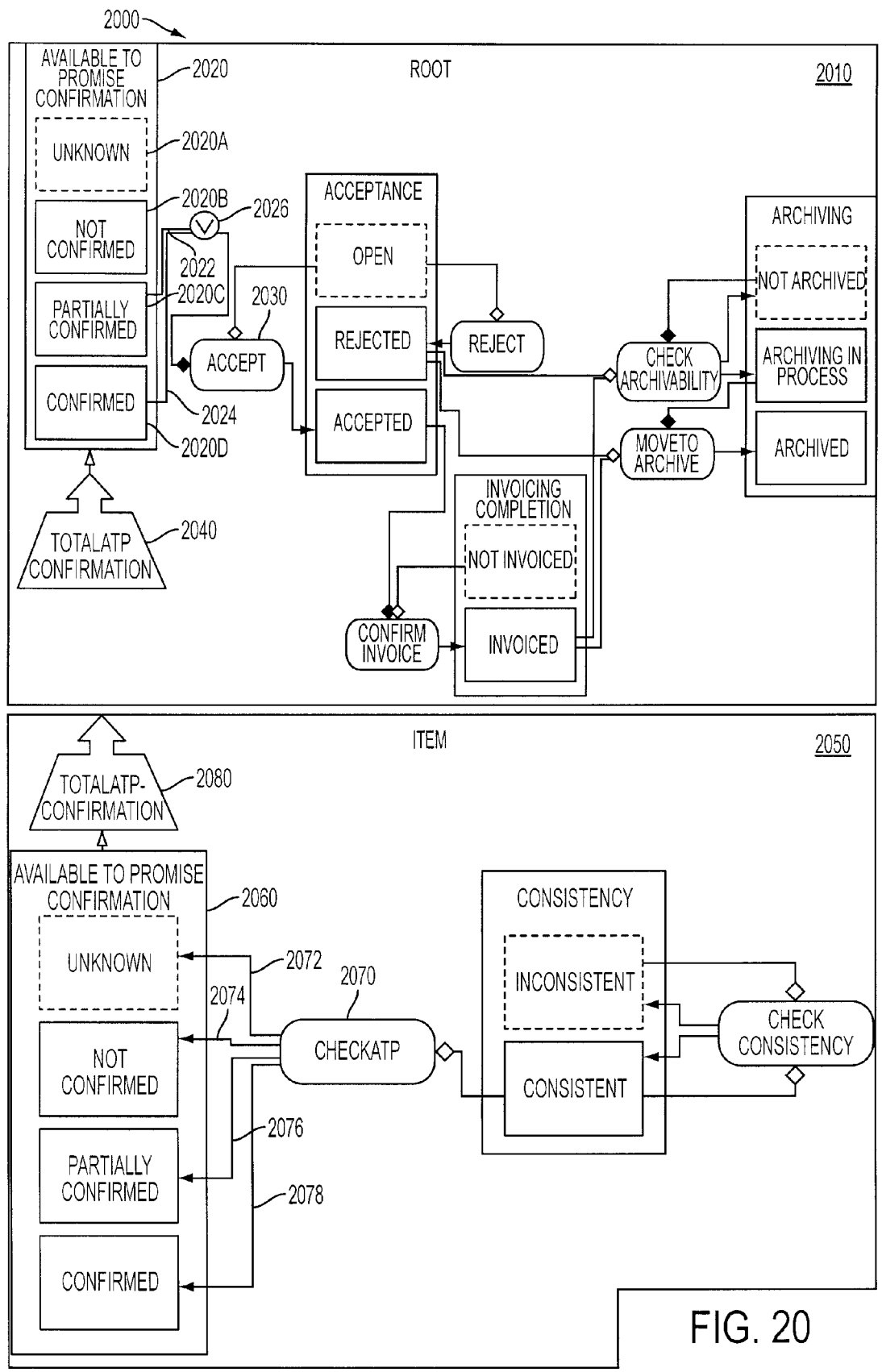

FIG. 20 illustrates another example 2000 of status aggregation. In particular, FIG. 20 illustrates sales order root status schema model 2010 and sale order item status schema model 2050, which are linked by total-availability status aggregation, represented as status aggregation 2040 in the root status schema model 2010 and status aggregation 2080 in the item status schema model. In this example, item status schema model 2050 includes availability-confirmation status variable 2060 (called "Available to Promise Confirmation") and a check-availability action 2070 (called "Check ATP"). The outcome of the check-availability action 2070 determines the value of status variable 2060, as represented by four status transitions 2072, 2074, 2076 and 2078. The root status schema model 2010 includes an availability-confirmation status variable 2020 (called "Available to Promise Confirmation") and an accept action 2030. The availability-confirmation status variable 2020 may have one of the values UNKNOWN 2020A, NOT CONFIRMED 2020B, PARTIALLY CONFIRMED 2020C and CONFIRMED 2020D. The accept action 2030 is allowed to be performed only if availability-confirmation status variable 2020 has either a value of PARTIALLY CONFIRMED 2020C or CONFIRMED 2020D, as represented by preconditions 2022 and 2024, which are combined by logic OR operator 2026.

In this example, the value of availability-confirmation status variable 2020 in root status schema model 2010 is determined by the current value of status schema model status variable 2060 in items status schema model 2050. This linking of two schemas is done by status aggregations 2040 and 2080. At runtime, a status aggregation process collects the values of availability-confirmation status variable 2060 in the item status schema instances 2050 and, based on that, determines the value of availability-confirmation status 2020 in root schema instance 2010.

Figure 21:
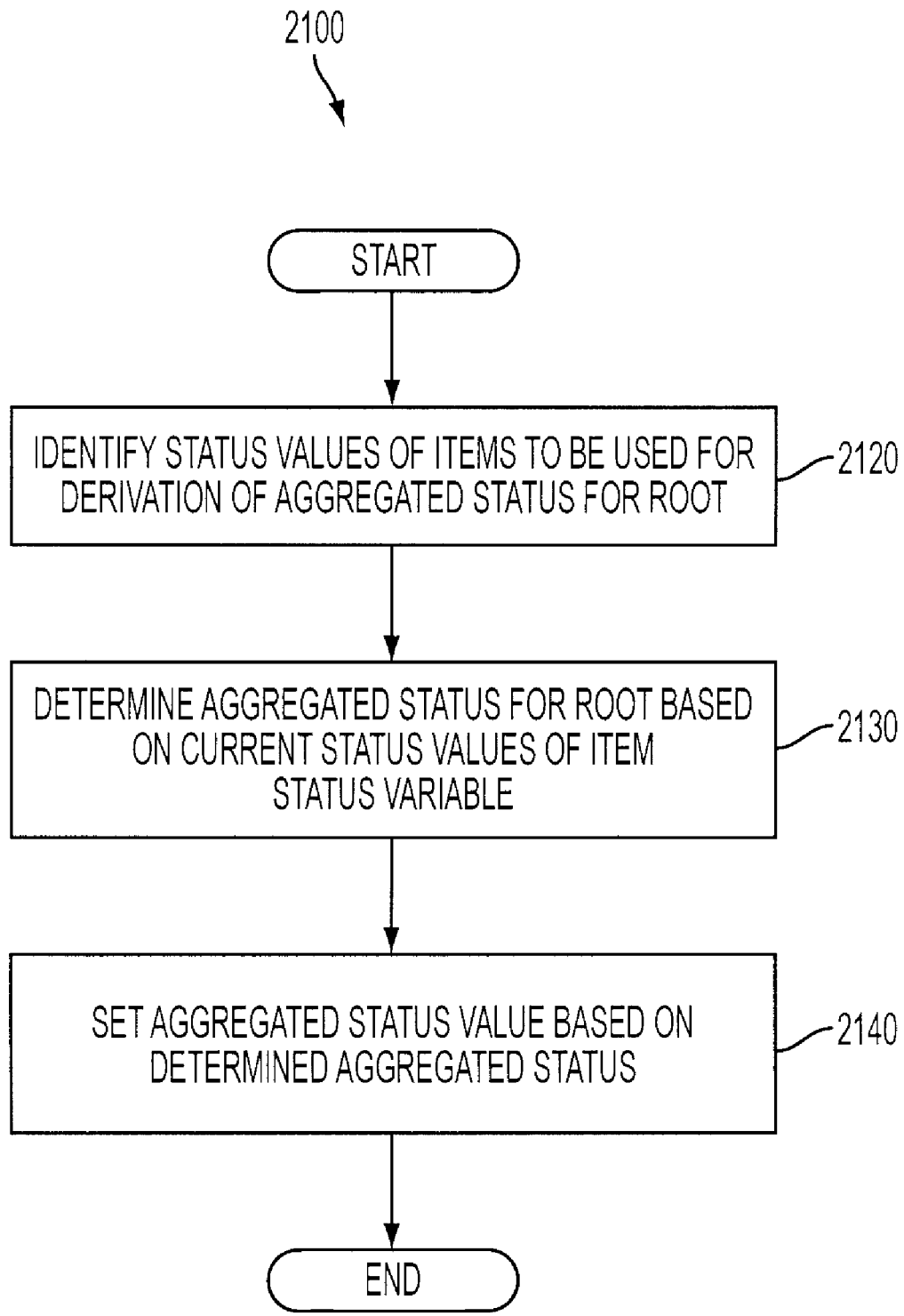
FIG. 21 is a flow chart of a process of status aggregation.

FIG. 21 illustrates a flow chart of a process 2100 of the derivation of an aggregated status for a root schema instance. The process 2100 is performed at runtime. In one example, the process 2100 may be performed at runtime by one or more processors of the computer system 110 of FIG. 1 or the processing computer system 110 of FIG. 3.

The system performing the process 2100 identifies the values of source variables in item schemas that will be used for the derivation of the aggregated status for the root schema step 2110). The system determines aggregated status for the root schema instance based on the current status values of the identified source status variables (step 2120). In one example, the determination process is implemented by the data object node instance or an application program. In another example, the determination process is implemented by the status management runtime. The system sets the value of the target status variable based on the determined status (step 2130) and the process ends.

Figure 22:
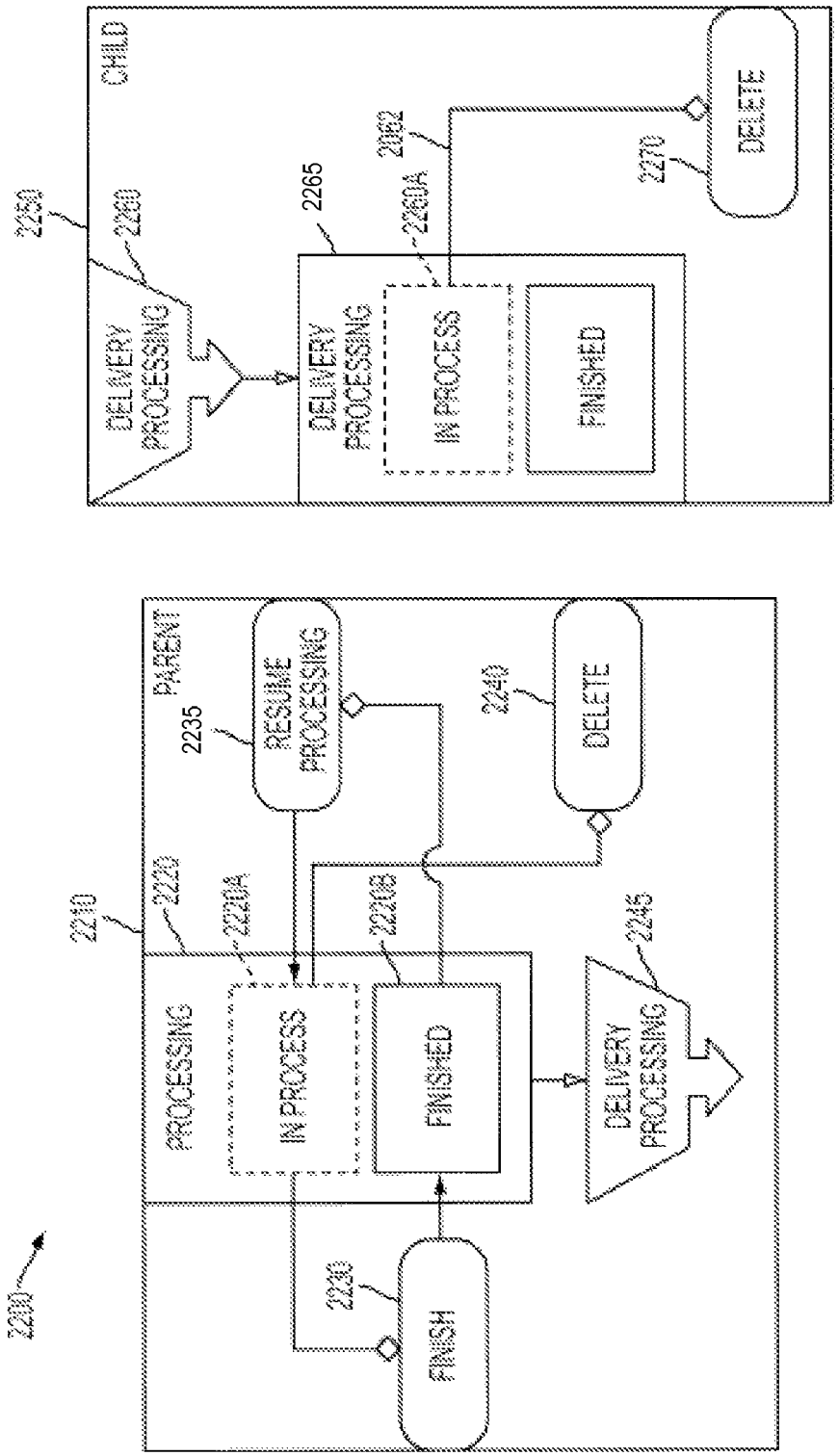

FIG. 22 illustrates an example of status population model in a status schema modeling system. A status population is a type of status derivation that operates on more than one schema instances. A status population is used to copy the current value of a source status variable at a source node instance to target status variables at one or more target node instances. At runtime, the target status variables have the status value of the source status variable.

One example of a use context for a status population is to copy a status value from a parent node to the child nodes of the parent node. The status population may be executed at the time (or soon thereafter) that the status value of the source status variable changes. In a graphical representation of the nodes, the same status population symbol is shown in the parent schema node and the child schema nodes. In the parent schema, the status population symbol is connected to the source status variable. In the child schema, the status population symbol is connected to the target status variable.

More particularly, FIG. 22 illustrates status schema models 2200 in which a parent delivery node 2210 and a child delivery node 2250 of the parent node 2210 are linked by a delivery-processing status population. The delivery-processing status population is represented by delivery-processing status population symbol 2245 in the parent node status schema model 2210 and represented by the delivery-processing status population symbol 2260 in the child node status schema model.

In the example of the models 2200, the parent delivery node includes a processing status variable 2220, a finish action 2230, a resume-processing action 2235, and a delete action 2240. The processing status variable may have one of the values IN PROGRESS 2220A or FINISHED 2220B. The child delivery node 2250 includes a delivery-processing status variable 2265 and a delete action 2270.

In this example, the delete action 2270 at child node 2250 is allowed to be performed only if the value of processing status variable 2220 at parent node 2210 has the value of IN PROGRESS 2220A. This represents a real-world constraint that a delete action should not be allowed once the processing has been finished. Such a cross-schema constraint may be implemented by using the delivery processing status population, which copies the value of processing status variable 2220 at the parent node 2210 to the processing status variable 2265 at the child node 2250. The precondition 2062 allows the delete action 2270 to be performed only if status variable 2265 has the value IN PROCESS 2260A. The status value for the processing status variable 2265 in the child node 2250 is copied from status variable 2220 through the delivery-processing status population. The status population symbol 2260 in the child node 2250 is part of the same status population process as the delivery-processing status population symbol 2245 in the parent node 2210.

Figure 23:
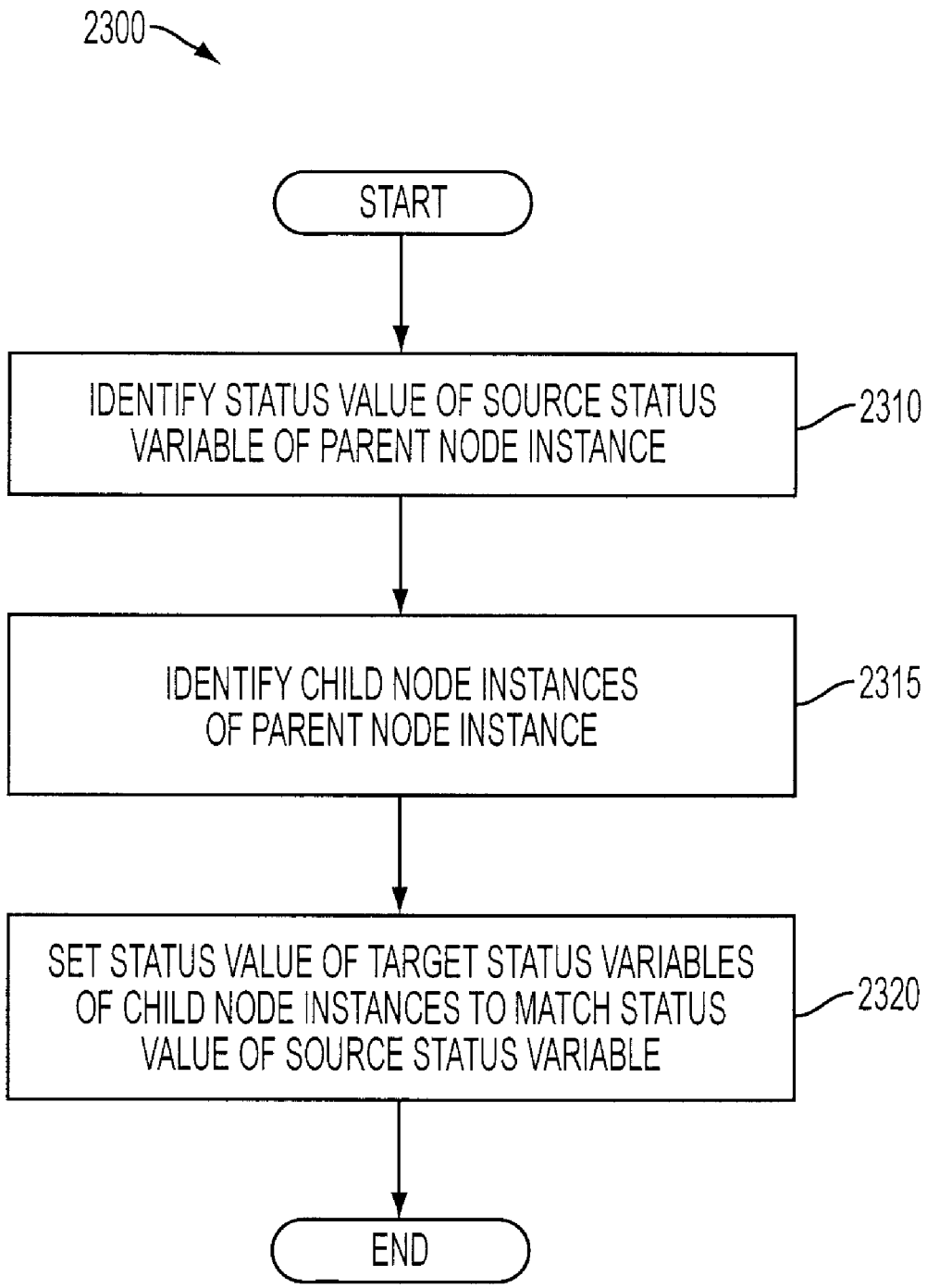
FIG. 23 is a flow chart of a process of status population.

FIG. 23 illustrates a flow chart of an example process 2300 of status population. The process 2300 may be performed at runtime. In one example, the process 2300 may be performed at runtime by one or more processors of the computer system 110 of FIG. 1 or the processing computer system 110 of FIG. 3.

The system performing the process 2300 identifies the value of a source status variable in parent node instance that is to be copied to target status variables of child node instances (step 2310). The system identifies child node instances of the parent node instance (step 2315). The instances of the child nodes may be of the same or different child node types.

The system sets the value of the target status variables of the one or more child nodes to match the status value of the source status variable in the parent node (step 2320), and the process 2300 ends.

Figure 24:
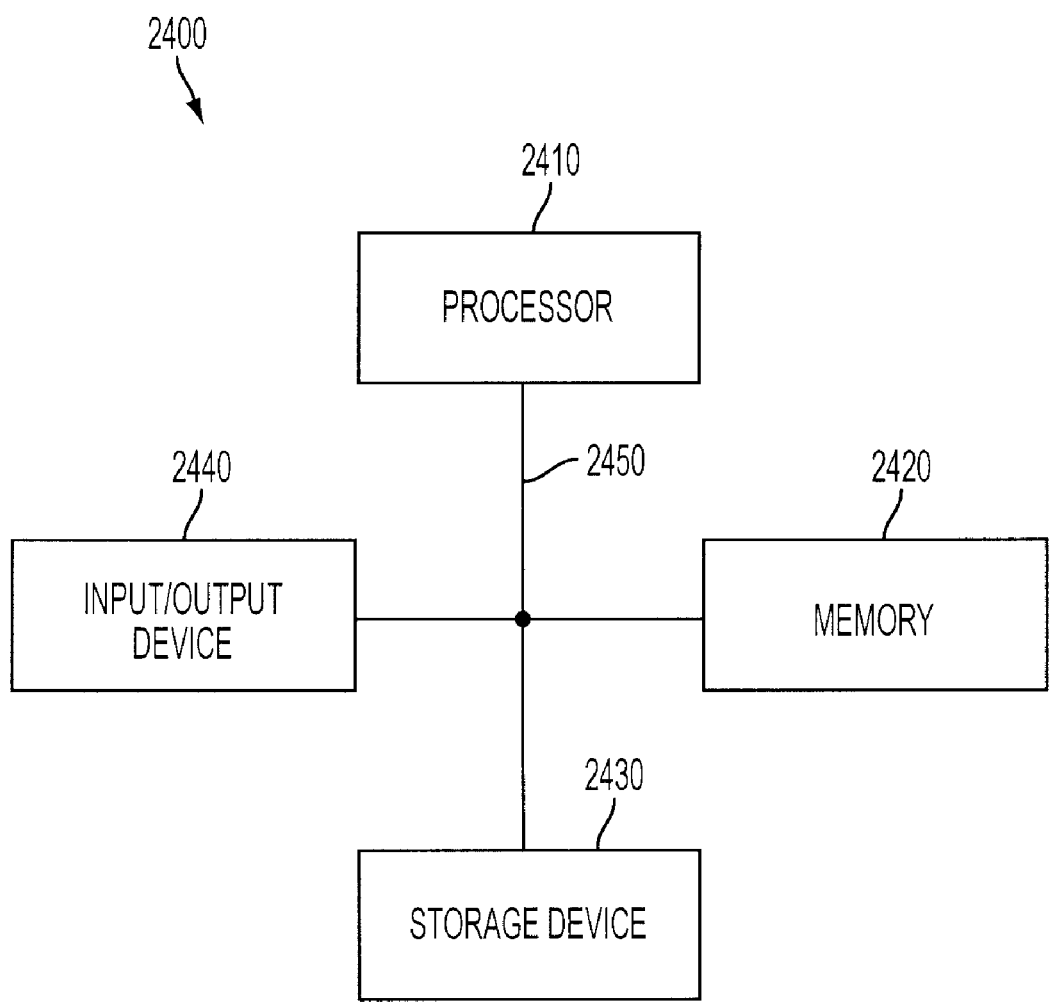
FIG. 24 is a block diagram of a computer system.

FIG. 24 is a block diagram of a computer system 2400 that can be used in the operations described above, according to one implementation. The system 2400 includes a processor 2410, a memory 2420, a storage device 2430 and an input/output device 2440. Each of the components 2410, 2420, 2430 and 2440 are interconnected using a system bus 2450. The processor 2410 is capable of processing instructions for execution within the system 2400. In some implementations, the processor 2410 is a single-threaded processor. In another implementation, the processor 2410 is a multi-threaded processor. The processor 2410 is capable of processing instructions stored in the memory 2420 or on the storage device 2430 to display graphical information for a user interface on the input/output device 2440.

The memory 2420 stores information within the system 2400. In one implementation, the memory 2420 is a computer-readable medium. In another implementation, the memory 2420 is a volatile memory unit. In still another embodiment, the memory 2420 is a non-volatile memory unit.

The storage device 2430 is capable of providing mass storage for the system 2400. In one embodiment, the storage device 2430 is a computer-readable medium. In various different embodiments, the storage device 2430 may be a floppy disk device, a hard disk device, an optical disk device, or a tape device.

For example, the runtime processing component 120 discussed previously with respect to FIGS. 1 and 3 may include the processor 2410 executing computer instructions that are stored in one of memory 2420 and storage device 2430. In another example, the implementation of modeling computer system 350 described above with respect to FIG. 3 may include the computer system 2400.

The input/output device 2440 provides input/output operations for the system 2400. In one implementation, the input/output device 2440 includes a keyboard and/or pointing device. In another implementation, the input/output device 2440 includes a display unit for displaying graphical user interface as discussed above.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device, or in computer-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

The techniques can be implemented in a distributed manner. For example, the functions of the input/output device 2440 may be performed by one or more computing systems, and the functions of the processor 2410 may be performed by one or more computing systems.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the techniques, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations of the techniques have been described. Nevertheless, it will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer program product tangibly embodied in a computer-readable storage device, medium, the computer program product comprising instructions that, when executed, cause a status management runtime component to perform operations in a business process comprising:
   receiving an indication of a first source status value of a first source status variable of an instance of a first child data object node;
   receiving an indication of a second source status value of a second source status variable of an instance of a second child data object node; and
   setting a target status value of a target status variable of an instance of a parent data object node based on the first source status value and the second source status value of the source status variable;
   wherein:
      the first child data object node and the second child data object node is than are child nodes of the parent data object node,
      the first child data object node is of a different node type than the second child data object node, the parent data object node corresponds to both a status management model for the parent data object node and a data model for the parent data object node, the first child data object node corresponds to both a status management model for the first child data object node and a data model for the first child data object node, the second child data object node corresponds to both a status management model for the second child data object node and a data model for the second child data object node, and each of the first and second source status variables and the target status variable is part of a process for providing a product, the process involving at least availability and approval checks.

2. The computer program product of claim 1 wherein the first source status value of the first source status variable of the first child data object node is different than the second source status value of the second source status variable of the second child data object node.

3. The computer program product of claim 1 further comprising instructions that, when executed, cause a runtime processing component to send, to the status management runtime component, an indication of the first source status value of the first source status variable of the instance of the first child data object node, an indication of the second source status value of the second source status variable of the instance of the second child data object node, and an indication of the instance of the parent data object node.

4. The computer program product of claim 1 wherein a runtime processing component includes the status management runtime component.

5. A computer program product tangibly embodied in a computer-readable storage device, the computer program product comprising instructions that, when executed, cause a status management runtime component to perform operations in a business process comprising:

identifying a first child source status variable of an instance of a data object and a second child source status variable of the instance of the data object, the first and second child source status variables identified for determining a status value for a parent lifecycle status variable of the instance of the data object, wherein the parent lifecycle status variable represents an overall status of the instance of the data object;

determining the status value for the parent lifecycle status variable based on a current status value of the first child source status variable and a current status value of the second child source status variable; and setting the parent lifecycle status variable to the determined status values;

wherein:

the data object node corresponds to both a status management model for the data object node and a data model for the data object node, and each of the first and second child source status variables and the parent lifecycle status variable being part of a process for providing a product, the process involving at least availability and approval checks.

6. The computer program product of claim 5 wherein determining the status value for the parent lifecycle status variable comprises:

accessing a table, each row of the table including a status value for the parent lifecycle status variable and one or more of a status value for the first child source status variable and a status value for the second child source status variable.

7. The computer program product of claim 6 wherein determining the status value for the parent lifecycle status variable further comprises:

accessing the current status value of the first child source status variable;

accessing the current status value of the second child source status variable;

identifying a first row in the table corresponding to the current status value of the first child source status variable and the current status value of the second child status variable; and identifying the status value for the parent lifecycle status variable in the first row.

8. The computer program product of claim 6 wherein determining the status value for the parent lifecycle status variable further comprises:

accessing the current status value of the first child source status variable;

identifying a first row in the table corresponding to the current status value of the first child source status variable; and identifying the status value for the parent lifecycle status variable in the first row.

\* \* \* \* \*